US012579917B2

(12) United States Patent
Feng

(10) Patent No.: US 12,579,917 B2
(45) Date of Patent: Mar. 17, 2026

(54) DISPLAY DEVICE INCLUDING MULTIPLE FRAME-MOUNTED DISPLAY MODULES

(71) Applicant: Shanghai Tianma Micro-electronics Co., Ltd., Shanghai (CN)

(72) Inventor: Hebing Feng, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 294 days.

(21) Appl. No.: 18/203,501

(22) Filed: May 30, 2023

(65) Prior Publication Data

US 2024/0331585 A1 Oct. 3, 2024

(30) Foreign Application Priority Data

Mar. 27, 2023 (CN) ......................... 202310313294.2

(51) Int. Cl.
*G09F 9/302* (2006.01)

(52) U.S. Cl.
CPC .................................. *G09F 9/3026* (2013.01)

(58) Field of Classification Search
CPC .... G09F 9/3026; G06F 1/1637; G06F 1/1647; G06F 1/1654
See application file for complete search history.

(56) References Cited

U.S. PATENT DOCUMENTS 11,908,352 B2 * 2/2024 Zhang .................. F16M 13/005
2014/0091686 A1 * 4/2014 Pegg .................. H04M 1/0252 312/222
2022/0165184 A1 5/2022 Zhang et al.

* cited by examiner

*Primary Examiner* — James Wu
(74) *Attorney, Agent, or Firm* — Anova Law Group, PLLC

(57) ABSTRACT

A display device including a frame, a first display module with a second chute, and a second display module with a first chute, is provided. The frame includes a first fixture including a chamber and a sliding rod movably connected in the chamber. The second chute includes a first end and a second end. The first end passes through an end of the first display module. The second chute includes a pole whose one end is fixed to the second end. The first chute has a cavity structure and at least one end of the first chute passes through an end of the second display module. The display device has a first state where the first fixture is nested in the second chute and the pole is inserted into the chamber such that the pole pushes out the sliding rod and the sliding rod is inserted into the first chute.

27 Claims, 32 Drawing Sheets

DISPLAY DEVICE INCLUDING MULTIPLE FRAME-MOUNTED DISPLAY MODULES

CROSS-REFERENCE TO RELATED APPLICATION

This application claims the priority of Chinese Patent Application No. 202310313294.2, filed on Mar. 27, 2023, the content of which is incorporated herein by reference in its entirety.

TECHNICAL FIELD

The present disclosure generally relates to the field of display technology and, more particularly, relates to a display device.

BACKGROUND

In many occasions such as exhibition halls, entertainment venues, and monitoring command centers, display panels with super-large screens are often needed for displaying images. Because of the difficulty to fabricate display panels with super-large screens, most of the current display devices with super-large areas are realized by splicing multiple small-sized display units, and splicing display is a feasible solution for realizing large-size and high-resolution display.

In practical applications, an assembly and disassembly structure of a splicing display device is complex, and there are often needs for disassembly, assembly, or replacement of a screen, resulting in more personnel required, long replacement time, and difficulty for disassembly and assembly. Further, the relative stability of adjacent splicing screens is poor, such that adjacent splicing screens are not on the same horizontal plane, or are relatively inclined, etc., easily resulting problems such as low overall flatness level and poor viewing effect.

Therefore, this is a need to provide a splicing display device that greatly simplifies disassembly and assembly, improves the efficiency of disassembly and assembly, enhances the stability between the spliced screens, has a high level of overall flatness, and improves user experience satisfaction.

SUMMARY

One aspect of the present disclosure provides a display device. The display device includes a frame, a first display module, and a second display module. The frame includes a first frame unit including a first fixture. The first fixture includes a chamber and a sliding rod is movably connected in the chamber through an elastic component. The first display module includes a second chute extending along a first direction. The second chute includes a first end and a second end opposite to each other in the first direction. The first end passes through an end of the first display module. The second chute includes a pole. One end of the pole is fixed to the second end and the pole extends along the first direction. The second display module includes a first chute. The first chute is a cavity structure and at least one end of the first chute passes through an end of the second display module. The display device has a first state. In the first state, the first fixture is nested in the second chute of the first display module and the pole of the first display module is inserted into the chamber of the first fixture, such that the pole of the first display module pushes out the sliding rod of the first fixture and the sliding rod of the first fixture is inserted into the first chute of the second display module.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
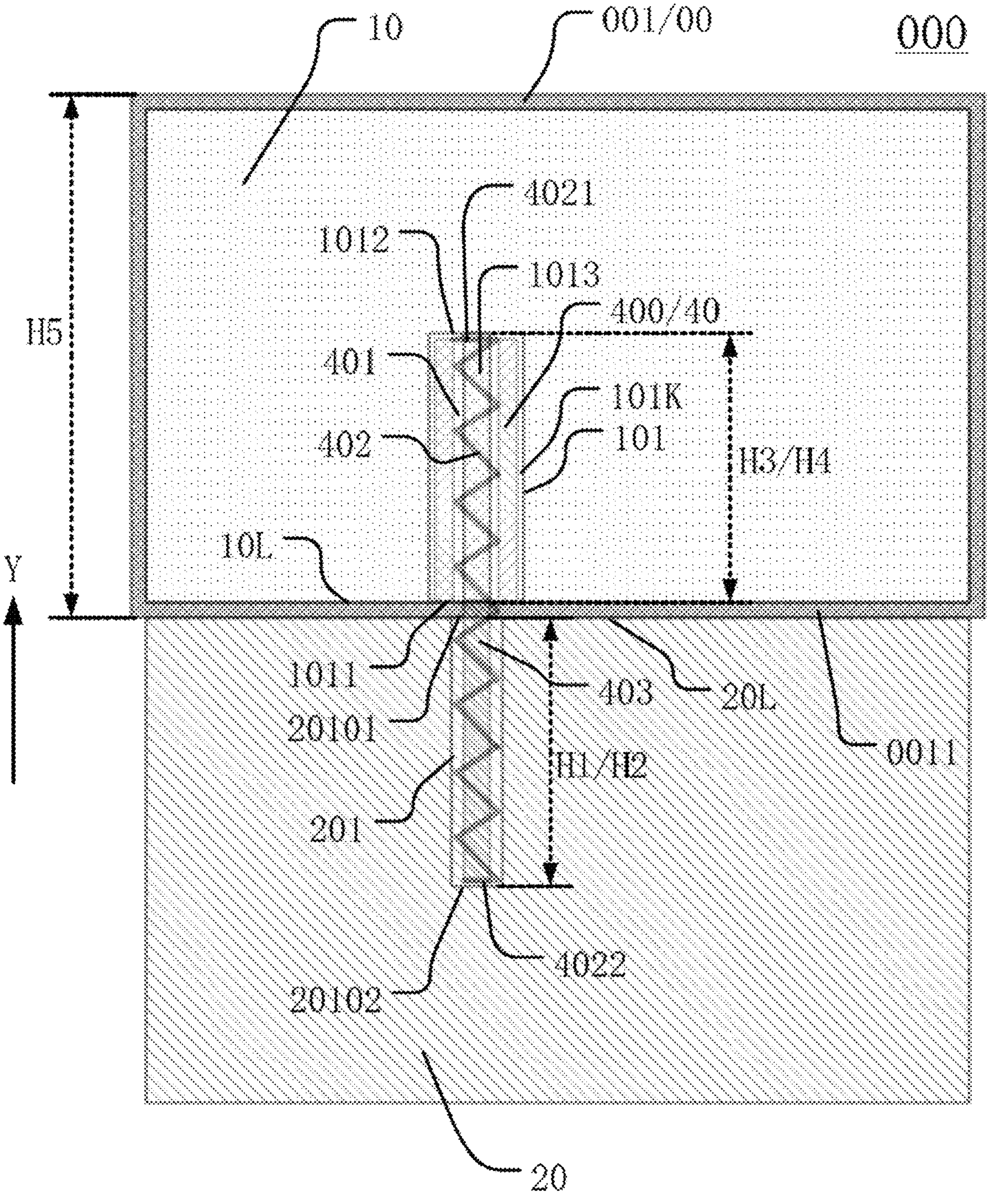
FIG. 1 illustrates an exemplary display device consistent with various disclosed embodiments of the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

Figure 2:
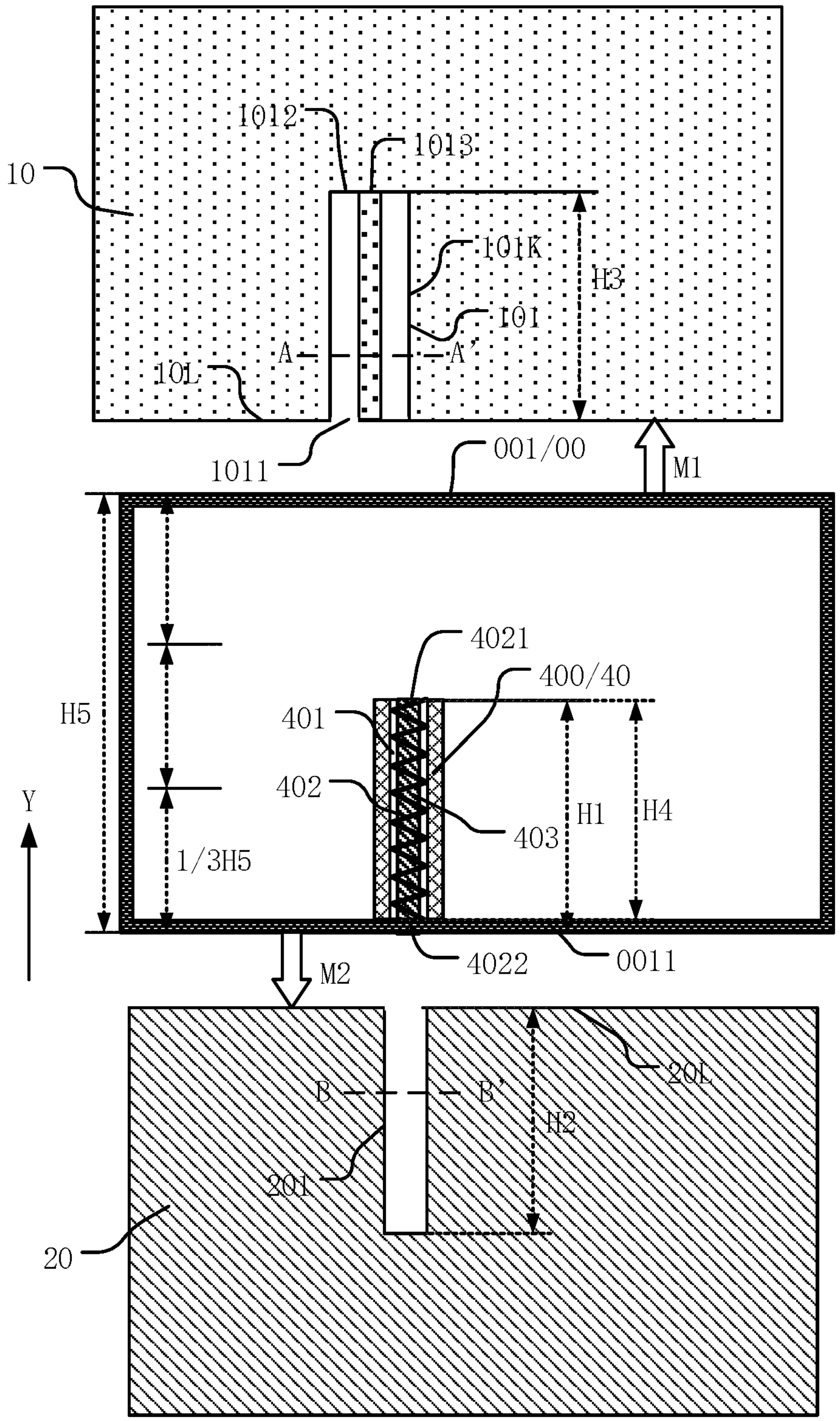
FIG. 2 illustrates a structure of a display device after disassembly in FIG. 1, consistent with various disclosed embodiments of the present disclosure.
Figure 3:
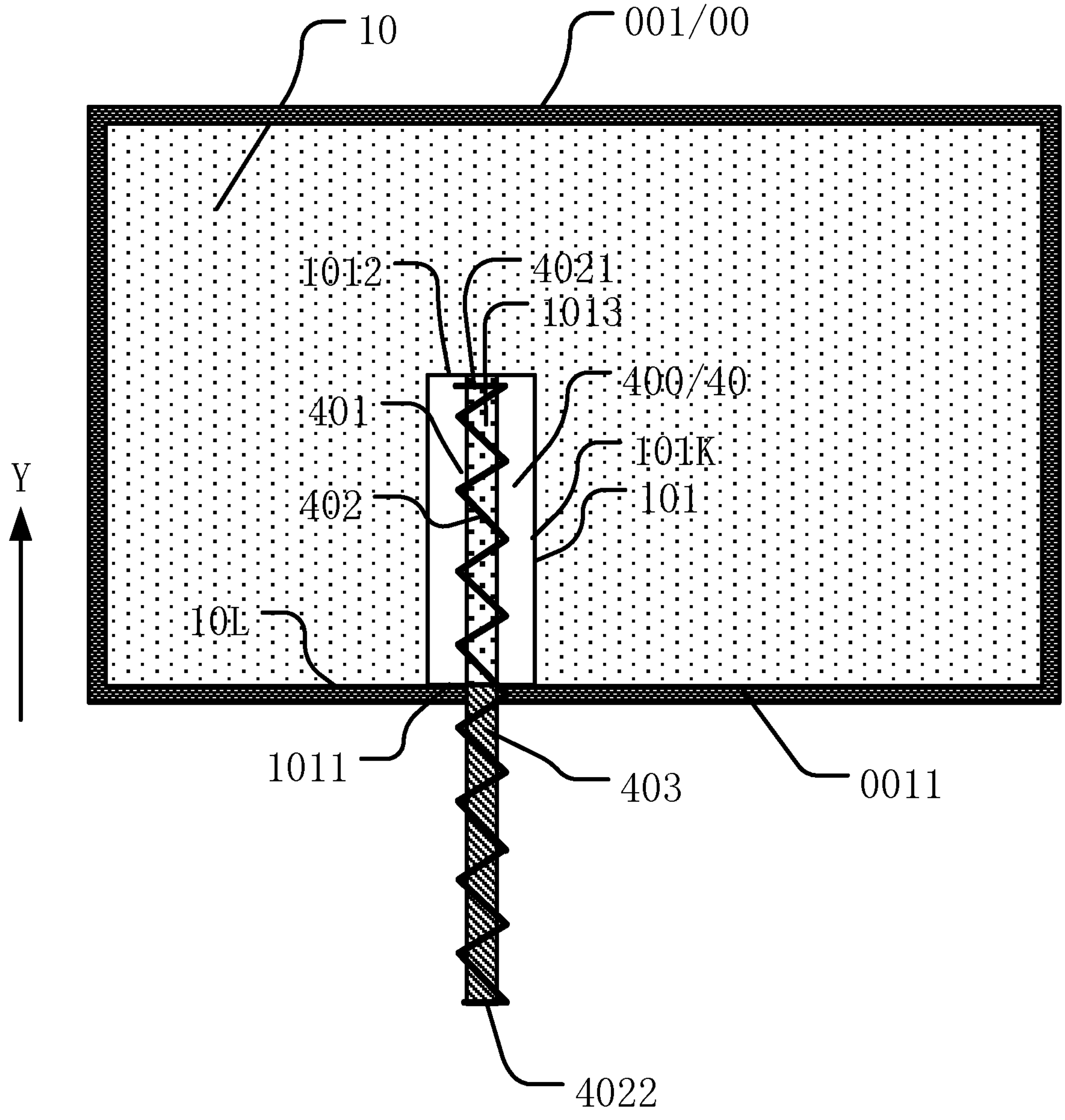
FIG. 3 illustrates a structure after a first display module mounted on a first frame module in FIG. 2, consistent with various disclosed embodiments of the present disclosure.
Figure 4:
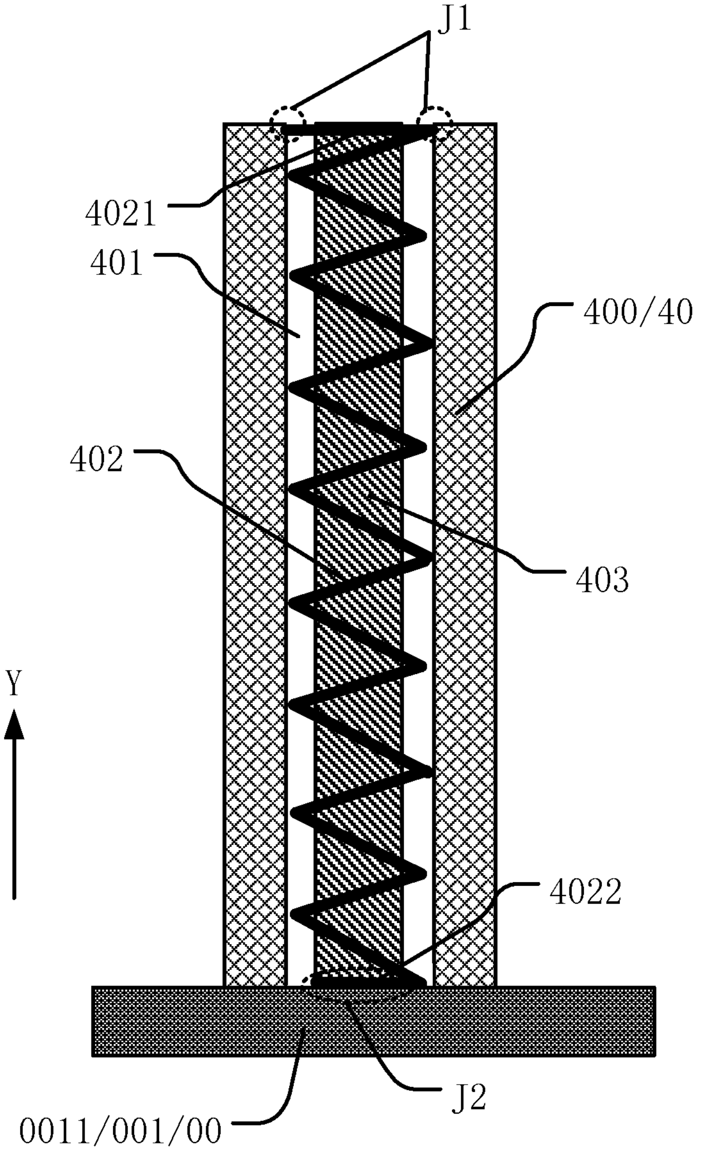
FIG. 4 illustrates a cross-sectional view of a first fixture of a first frame module in FIG. 2, consistent with various disclosed embodiments of the present disclosure.
Figure 5:
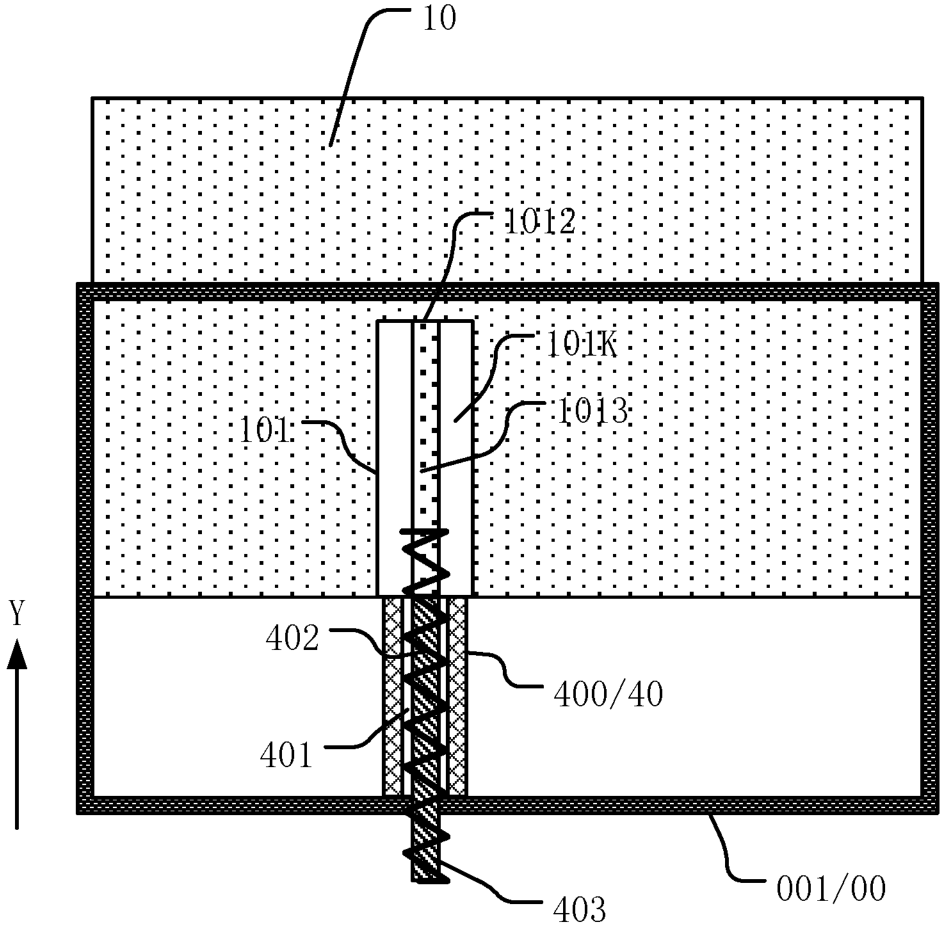
FIG. 5 illustrates a perspective view of a sliding rod partially ejected by a pole in a second chute of the first display module when splicing FIG. 2 to form FIG. 3, consistent with various disclosed embodiments of the present disclosure.
Figure 6:
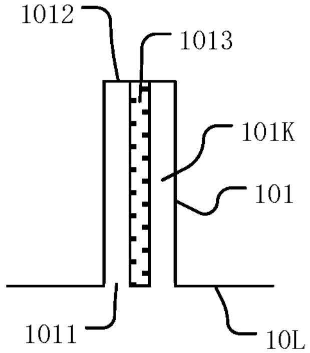
FIG. 6 illustrates a cross-sectional view of a second chute of a first display module, consistent with various disclosed embodiments of the present disclosure.
Figure 7:
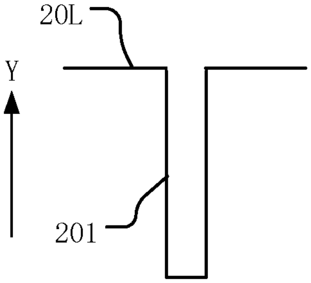
FIG. 7 illustrates a cross-sectional view of a first chute of a second display module, consistent with various disclosed embodiments of the present disclosure.

The present disclosure provides a display device. As shown in FIG. 1 illustrating an exemplary display device, FIG. 2 illustrating a structure of the display device after disassembly in FIG. 1, FIG. 3 illustrating a structure after a first display module mounted on a first frame module in FIG. 2, FIG. 4 illustrating a cross-sectional view of a first fixture of a first frame module in FIG. 2, FIG. 5 illustrating a perspective view of a sliding rod partially ejected by a pole in a second chute of the first display module when splicing FIG. 2 to form FIG. 3, FIG. 6 illustrating a cross-sectional view of a second chute of a first display module in FIG. 2, and FIG. 7 illustrating a cross-sectional view of a first chute of a second display module in FIG. 2, in one embodiment, the display device 000 may include a frame 00, a first display module 10, and a second display module 20.

The frame 00 may at least include a first frame unit 001. The first frame unit 001 may include a first fixture 40. The first fixture 40 may include a chamber 401, and a sliding rod 403 may be movably connected to the chamber 401 through an elastic component 402.

The first display module 10 may include a second chute 101, and the second chute 101 may extend along a first direction Y. The second chute 101 may include a first end 1011 and a second end 1012 opposite in the first direction Y. The first end 1011 may pass through the end 10L of the first display module 10, and the second chute 101 may include a pole 1013. One end of the pole 1013 may be fixed to the second end 1012, and the pole 1013 may extend along the first direction Y.

The second display module 20 may include a first chute 201. The first chute 201 may include a cavity structure, and at least one end of the first chute 201 may be connected to the end 20L of the second display module 20.

The display device 000 may have a first state. Optionally, the first state may be a state where the first display module 10 and the second display module 20 of the display device are spliced.

In the first state, the first fixture 40 may be nested in the second chute 101 of the first display module 10, and the pole 1013 of the first display module 10 may be inserted into the first fixture 40. The pole 1013 of the first display module 10 may push out the sliding rod 403 of the first fixture 40, and the sliding rod 403 of the first fixture 40 may be inserted into the first chute 201 of the second display module 20.

In the present embodiment, the display device 000 may be a spliced display device, and the display device 000 may include the frame 00, the first display module 10 and the second display module 20. The first display module 10 and the second display module 20 may be spliced through the frame 00 to form the large-sized display device 000. Optionally, the first display module 10 and the second display module 20 may both have a module structure including a display panel respectively, and the assembly structure arranged on the display modules may only need to not affect the normal display effect of the display panels. The frame 00 may at least include the first frame unit 001. Optionally, the first frame unit 001 may be designed according to the shape of the first display module 10. For example, as shown in the figure, the first display module 10 may be a rectangular display module, and the first frame unit 001 may also be a rectangular frame structure accordingly. The first fixture 40 may be fixedly disposed on the first frame unit 001, and the first display module 10 may be installed on the first frame unit 001 through the first fixture 40. The chamber 401 may be provided in the first fixture 40, and the chamber 401 may be a chamber that runs through the interior of the first fixture 40. The sliding rode 403 may be movably connected to the chamber 401 through an elastic component 402, and the sliding rod 403 may be extended and retracted in the chamber 401 through elastic expansion and contraction of the elastic component 402. For example, the sliding rod 403 may be extended to the outside of the chamber 401 when the elastic component 402 is stretched under the action of an external force (as shown in FIG. 1), and the sliding rod 403 may be retracted to the inside of the chamber 401 when the elastic component 402 is reset and retracted. This embodiment is only used as an example to illustrate the structure in which the sliding rod 403 is movably connected through the elastic component 402 in the chamber 401 of the present disclosure, and does not limit the scope of the present disclosure. The specific implementation includes but is not limited to this, and may be other suitable tensile structures.

The first display module 10 may include the second chute 101. The second chute 101 may include the first end 1011 and the second end 1012 opposite to each other in its extension direction, that is, the first direction Y. A portion of the second chute at the first end 1011 may be connected to the end 10L of the first display module 10, that is, the second chute 101 may start at the end 10L of the first display module 10 and gradually penetrate into the first display module 10 to reach the second end 1012 of the second chute 101. The pole 1013 may be provided in the second chute 101 and one end of the pole 1013 may be fixed to the second end 1012. The pole 1013 may extend along the first direction Y, and may be a strip-shaped structure with one end fixed at the second end 1012 of the second sliding slot 101. The other end of the pole 1013 may extend to the end 10L of the first display module 10 without contacting the side wall of the second chute 101. Optionally, the outer diameter of the pole 1013 may be less than the inner diameter of the second chute 101, such that there is a first interval 101K between the pole 1013 and the side wall of the second chute 101.

The second display module 20 may include the first chute 201. The first chute 201 may be a cavity structure, and at least one end of the first chute 201 may be connected with the end 20L of the second display module 20. That is, the first chute 201 may be a structure starting from the end 20L of the second display module 20 and gradually penetrating into the second display module 20 to reach the bottom of the first chute 201.

The display device 000 may have the first state, and the first state may be understood as a spliced state of the first display module 10 and the second display module 20 of the display device (as shown in FIG. 1). When the display device 000 is spliced from the disassembled state shown in FIG. 2 to the first state shown in FIG. 1 (the arrows M1 and M2 in FIG. 2 indicate the direction of disassembly), the first fixture 40 may be nested in the second chute 101 of the first display module 10, such that the first display module 10 is fixed on the first frame unit 001 of the frame 00 through the first fixture 40. Since there is the first interval 101K between the pole 1013 in the second chute 101 and the side wall of the second chute 101, the first fixture 40 may be inserted into the first interval 101K, and the pole 1013 in the second chute 101 of the first display module 10 may be inserted into the chamber 401 of the first fixture 40. Correspondingly, the pole 1013 may push out the sliding rod 403 of the first fixture 40. Because of the stretching function of the elastic component 402, although the sliding rod 403 is pushed out of the chamber 401 of the first fixture 40, it may be still in a state of movably connection with the elastic component 402 (as shown in FIG. 3). After the sliding rod 403 is pushed out of the chamber 401 of the first fixture 40, the sliding rod 403 may continue to be inserted into the first chute 201 of the second display module 20 along the first direction Y, such that the second display module 20 is spliced and fixed with the first display module 10 through the insertion of the sliding rod 403 pushed out to the outside of the chamber 401 of the first fixture 40 and the first chute 201, to form a splicing module structure, as shown in FIG. 1. This embodiment adopts the above splicing assembly structure to form an interlocking structure, which may minimize the gap between the spliced first display module 10 and the second display module 20, and increase the stability of the spliced first display module 10 and the second display module 20. The overall flatness and the user's viewing effect may be improved. Future, the splicing effect may be realized by setting the second chute 101 on the first display module 10, setting the first fixture 40 on the frame 00, and opening the first chute 201 on the second display module 10, operation may be simple and short, greatly reducing the corresponding adjustment time between the display modules. Cooperation between different mechanism parts may be smooth, which may effectively reduce the difficulty of splicing, ensure the splicing effect and improve the assembly efficiency at the same time.

The display device 000 provided by the present embodiment may use the structure of the frame 00 to realize the splicing of at least two display modules and the first frame unit 001 at one time. In comparison with a method where the frame unit is spliced with individual display module first and then the at least two structures formed by the display modules and the frame units are spliced, in the present embodiment, the step-by-step assembly steps may be saved to further improve the assembly efficiency.

It should be noted that, the embodiment with the structure of the first display module 10 and the second display module 20 shown in figures is used only as an example to illustrate the present disclosure, and does not limit the scope of the present disclosure. In actual implementation, the structure of the display modules includes but is not limited to this, and also may include other structures capable of achieving display effects and assembling effects.

In one embodiment, as shown in FIG. 1 to FIG. 7, the display device 000 may also have a second state. In the second state of the display device 000, the pole 1013 of the first display module 10 may be pulled out from the chamber 401 of the first fixture 40, and the first display module 10 and the first fixture 40 may be separated. The sliding rod 403 of the first fixture 40 may retract from the first chute 201 of the second display module 20 into the chamber 401 of the first fixture 40, and the second display module 20 and the first fixture 40 may be separated.

The display device 000 may also have the second state; and the second state may be understood as a disassembled state of the display device 000 as shown in FIG. 2. When the display device 000 is disassembled from the first state shown in FIG. 1 to the second state shown in FIG. 2, the pole 1013 in the first chute 101 included in the first display module 10 may be pulled out from the chamber 401 of the first fixture 40 on the first frame unit 001, such that the first display module 10 is separated from the first fixture 40. After the pole 1013 is pulled out from the chamber 401, under the reset and retraction action of the connected elastic component 402, the sliding rod 403 of the first fixture 40 may also be pulled back from the first chute 201 of the second display module 20 because of elastic retraction effect, and be retracted. into the chamber 401 of the first fixture 40, such that the second display module 20 is separated from the first fixture 40 and complete the disassembly and separation of the first display module 10 and the second display module 20 from the first frame unit 001. This embodiment adopts the above-mentioned disassembly structure that is able to be assembled and disassembled, such that not only an interlocking structure between the first display module 10 and the second display module 20 after splicing is able to be formed but also the gap between is able to be minimized. Therefore, the stability between the first display module 10 and the second display module 20 after splicing may be increased. The overall flatness and the user's viewing effect may be improved. Future, the assembly and disassembly process may be simple and short, greatly reducing the corresponding adjustment time between the display modules and simplifying the assembly and disassembly process. Cooperation between different mechanism parts may be smooth, which may effectively reduce the difficulty of splicing, ensure the splicing effect and improve the assembly/disassembly efficiency at the same time.

In one embodiment, as shown in FIG. 1 and FIG. 3, the first frame unit 001 may include a crossbar 0011, and the first fixture 40 may be fixed on the crossbar 0011. In the first state, the first display module 10 may be located at a side of the crossbar 0011, and the second display module 20 may be located at another side of the crossbar 0011.

In the present embodiment, when the first display module 10 and the second display module 20 are spliced through the frame 00, the first frame unit 001 for accommodating the first display module 10 may include the crossbar 0011, and the crossbar 0011 may be used to fix the first fixture 40 included in the first frame unit 001. When the first display module 10 is assembled on the first frame unit 001, one end of the first fixture 40 may be fixed on the crossbar 0011 along the first direction Y, and the other end of the first fixture 40 may face a side away from the crossbar 0011. When the first fixture 40 is fixed to the crossbar 0011, the sliding rod 403 and the elastic component 402 of the first fixture 40 may be not fixed to the crossbar 0011, and it is only necessary to ensure that the main of the first fixture 40 is fixed to the crossbar 0011. Optionally, only a portion of the end of the first fixture 40 may be fixed to the crossbar 0011 to expose the sliding rod 403 and the elastic component 402 of the first fixture 40 which may be easy to be inserted into the first chute 201 of the second display module 20 during splicing. In another embodiment, a through hole may be provided on the crossbar 0011, such that the sliding rod 403 and the elastic component 402 of the first fixture 40 pass through the through hole and are inserted into the first chute 201 of the second display module 20. The fixing structure of the first fixture 40 and the crossbar 0011 is not specifically limited, and the setting can be selected according to actual needs during specific implementation.

After the first display module 10 is installed on the first frame unit 001, as shown in FIG. 3, the first display module 10 may be located on one side of the crossbar 0011. After the first display module 10 and the second display module 20 are spliced, as shown in FIG. 1, the second display module 20 may be located on the other side of the crossbar 0011. That is, in the first direction Y, the first display module 10 and the second display module 20 may be located on two opposite sides of the crossbar 0011, to form a spliced structure of the display device 000.

Optionally, when the first display module 10 and the second display module 20 are disassembled, the pole 1013 in the second chute 101 included in the first display module 10 may be pulled out from the chamber 401 of the first fixture 40 first, and the first display module 10 may be separated and disassembled from the first frame unit 001. The elastic component 402 in the first fixture 40 may elastically retract and pull back the sliding rod 403 in the first chute 201 of the second display module 20, such that the sliding rod 403 may be pulled out from the first chute 201 of the second display module 20 and the second display module 20 may be separated from the first frame unit 001 and disassembled to realize the disassembly process of the display device 000. The disassembly and assembly process of the display device 000 may be simplified through the first frame unit 001 including the crossbar 0011, and the disassembly and assembly efficiency may be improved while ensuring the splicing effect.

The present embodiment with the first frame unit 001 including the crossbar 0011 is used as an example only to illustrate the present disclosure, and does not limit the scope of the present disclosure. In practice, the structure of the first frame unit 001 includes but is not limited to this, and may also include other suitable structures. For example, in another embodiment, the first frame unit 001 may include another structure other than the crossbar 0011 to form a frame matching the shape of the first display module 10, and the first frame unit 001 and the first display module 10 may be able to be accommodated in the frame structure formed by the first frame unit 001 after being assembled.

In some embodiments shown in FIG. 1 to FIG. 7, the elastic component 402 may include a spring. One end 4021 of the spring may be connected to the end of the chamber 401 away from the crossbar 0011, and the other end 4022 of the spring may be connected to the end of the sliding rod 403 facing the crossbar 0011 (as shown in FIG. 2 and FIG. 4).

Optionally, the elastic component 402 may be a spring, and the arrangement structure of the spring and the sliding rod 403 may be an arrangement in which the spring is wound around the periphery of the sliding rod 403.

Optionally, the elastic component 402 may be in a stretched state (as shown in FIG. 1) in the first state of the display device 000, and the elastic component 402 may be in a compressed state (as shown in FIG. 2) in the second state of the display device 000, The compressed state may be understood as the original state of the elastic component 402, that is, the spring may be an extension spring. As shown in FIG. 2 and FIG. 4, when the extension spring is not subjected to external force, the coils of the spring may be generally close to each other and there may be no gap or small gap between them. As shown in FIG. 1, when the tension spring bears an external force load, for example, when the pole 1013 withstands the sliding rod 403 such that the other end 4022 of the spring held by the sliding rod 403 is driven away from the chamber 401, gaps may be formed between coils of the spring or the gaps may be larger than that in the original state, such that the spring is in a stretched state.

In the present embodiment, a structure in which the sliding rod 403 is movably connected to the chamber 401 of the first fixture 40 may include that the elastic component 402 may be a spring, and one end 4021 of the spring may be connected to the end of the chamber 401 away from the crossbar 0011. As shown in FIG. 4, at a first connection position J1 on the inner wall of the chamber 401, one end 4021 of the spring may be fixed to the inner wall of the chamber 401. The other end 4022 of the spring may be connected to the end of the sliding rod 403 facing the crossbar 0011. As shown in FIG. 4, the other end 4022 of the spring may be fixed to the end of the sliding rod 403 at the second connection position J2 on the sliding rod 403. The spring at other positions may be all wound around the periphery of the sliding rod 403. The sliding rod 403 may be stretched out and retracted in the chamber 401 by the stretching action of the spring force. The original state of the spring provided in this embodiment may be a compressed state. Therefore, the spring in the compressed state may retract into the chamber 401 when the display device 000 is disassembled in the second state, such that the sliding rod 403 may be also located in the chamber 401 (as shown in FIG. 4). When entering the first state of the display device 000, that is, the splicing state, as shown in FIG. 1, the pole 1013 in the second chute 101 of the first display module 10 may be inserted into the chamber 401 and push out the sliding rod 403 from the chamber 401. With the further insertion of the pole 1013, the sliding rod 403 may be pushed out of the chamber 401, and the end of the sliding rod 403 may drive the other end 4022 of the spring to stretch, such that the entire spring gradually becomes stretched. Although the sliding rod 403 is pushed out of the chamber 401 of the first fixture 40 and inserted into the first chute 201 of the second display module 20, one end 4021 of the spring may be still in the chamber and connected to the inner wall of the chamber 401 at the first connection position J1 on the inner wall of the chamber 401. That is, the sliding rod 403 may still be movably connected to the chamber 401 through the spring. When the display device 000 is disassembled and returned to the second state, as shown in FIG. 2, the pole 1013 may be pulled out from the chamber 401 and the force for pushing the sliding rod 403 may be released. Correspondingly, the spring may return and retract, that is, the other end of the spring 4022 may drive the sliding rod 403 to retract into the chamber 401 and the sliding rod 403 may be pulled out from the first chute 201 of the second display module 20, to separate the second display module 20 from the first display module 10. In this embodiment, the chamber 401 of the first fixture 40 may be movably connected to the specific structure of the sliding rod 403 through the elastic component 402, such that the splicing and disassembling process of the first display module 10 and the second display module 20 may be performed without any other kinetic energy but only need the self kinetic of the insertion of the pole 1013 and the automatic expansion and contraction of the elastic component 402 with the spring structure. The disassembly and assembly process of the modules may be smoother, which may reduce the difficulty of disassembly and assembly, and improve the disassembly and assembly efficiency.

In some embodiments shown in FIG. 1 to FIG. 7, the first fixture 40 of the first frame unit 001 may include a main column 400, and a chamber 401 may be provided in the main column 400. The first fixture 40 may be fixed with the crossbar 0011 by the main column 400.

A shape of the main column 400 may match a shape of the second chute 101.

In the present embodiment, the structure of the first fixture 40 may include the main column 400. The main column 400 may be a structure nested in the second chute 101 of the first display module 10, and the shape of the main column 400 may match the shape of the second chute 101. For example, when the shape of the main column 400 is cylindrical, the shape of the inner wall of the second chute 101 may be also cylindrical, such that the splicing of the first display module 10 and the first frame unit 001 may be realized in the first state. The insertion of the first fixture 40 and the second chute 101 may be smoother. The chamber 401 may be provided in the main column 400. The chamber 401 may be a cylindrical groove structure that runs through the main column 400. The first fixture 40 may be fixed by the main column 400 with the crossbar 0011. The elastic component 402 and the sliding rod 403 in the chamber 401 of the first fixture 40 may not be fixed with the crossbar 0011, to expose the sliding rod 403 and the elastic component 402 of the first fixture 40. Therefore, in the first state of splicing, the sliding rod 403 may be able to drive part of the elastic component 402 to penetrate into the first chute 201 of the second display module 20, to realize the splicing effect of the first display module 10 and the second display module 20 and improve splicing stability.

In some embodiments shown in FIG. 1 to FIG. 7, the shape of the sliding rod 403 may match the shape of the cavity structure of the first chute 201. The length H1 of the sliding rod 403 may be equal to the depth H2 of the first chute 201. The shape of the pole 1013 may match the shape of the chamber 401, and the length H3 of the pole 1013 may be equal to the depth H4 of the chamber 401.

In the present embodiment, the shape of the cavity structure of the first chute 201 may be a cylindrical groove structure, and the shape of the sliding rod 403 of the first fixture 40 may also be a cylindrical structure, and the length H1 of the sliding rod 403 may be equal to the depth H2 of the first chute 201, such that the insertion may be smoothly when the sliding rod 403 is inserted into the first chute 201 of the second display module 20 in the first state and the disassembly may be convenient. The shape of the pole 1013 may be a cylindrical structure, and the shape formed by the inner wall of the chamber 401 of the first fixture 40 may also be cylindrical. The length H3 of the pole 1013 may be equal to the depth H4 of the chamber 401. In the first state, when the pole 1013 of the first display module 10 pushes out the sliding rod 403 in the chamber 401, it may be inserted and pulled out smoothly in the channel formed by the inner wall of the chamber 401, facilitating the disassembly operation of the modules.

In some embodiments shown in FIG. 1 to FIG. 7, along the extending direction of the length of the sliding rod 403, that is, along the first direction Y, the length H1 of the sliding rod 403 may be larger than ⅓ of the width H5 of the first frame unit 001.

In the present embodiment, in the first direction Y, that is, along the length extension direction of the sliding rod 403, the length H1 of the sliding rod 403 included in the first fixture 40 may be larger than ⅓ of the width H5 of the first frame unit 001. The length of a portion of the sliding rod 403 plugged into the first chute 201 of the second display module 20 after the modules are spliced may be prevented from being too short when the length H1 of the sliding rod 403 is too short. Also, the plugging and connection stability of the first display module 10 and the first fixture 40 may be prevented from being affected by a short length of the chamber 401 of the first fixture 40 in the first direction Y, thereby making the splicing of the first display module 10 and the second display module 20 more reliable.

Figure 8:
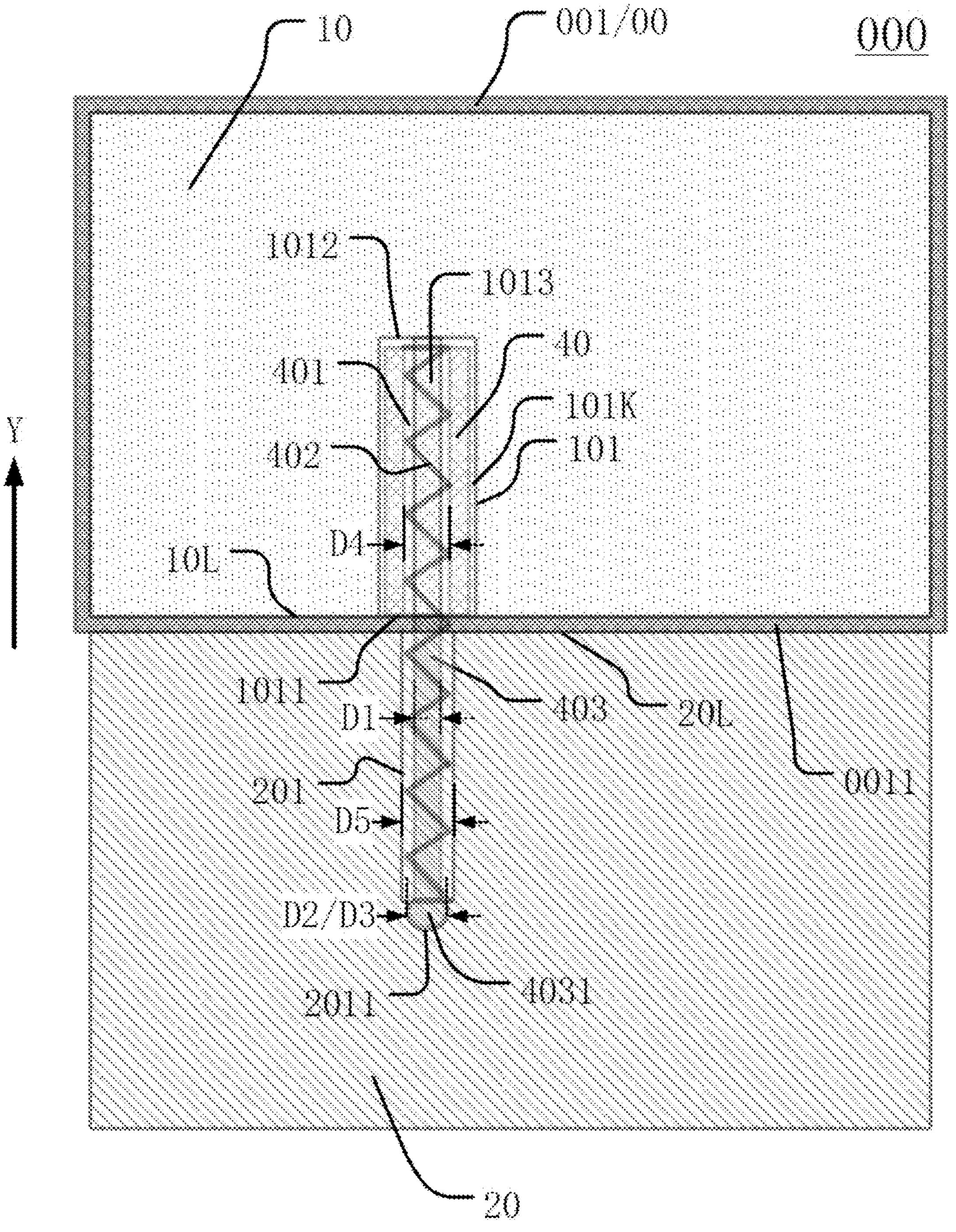
FIG. 8 illustrates another exemplary display device consistent with various disclosed embodiments of the present disclosure.
Figure 9:
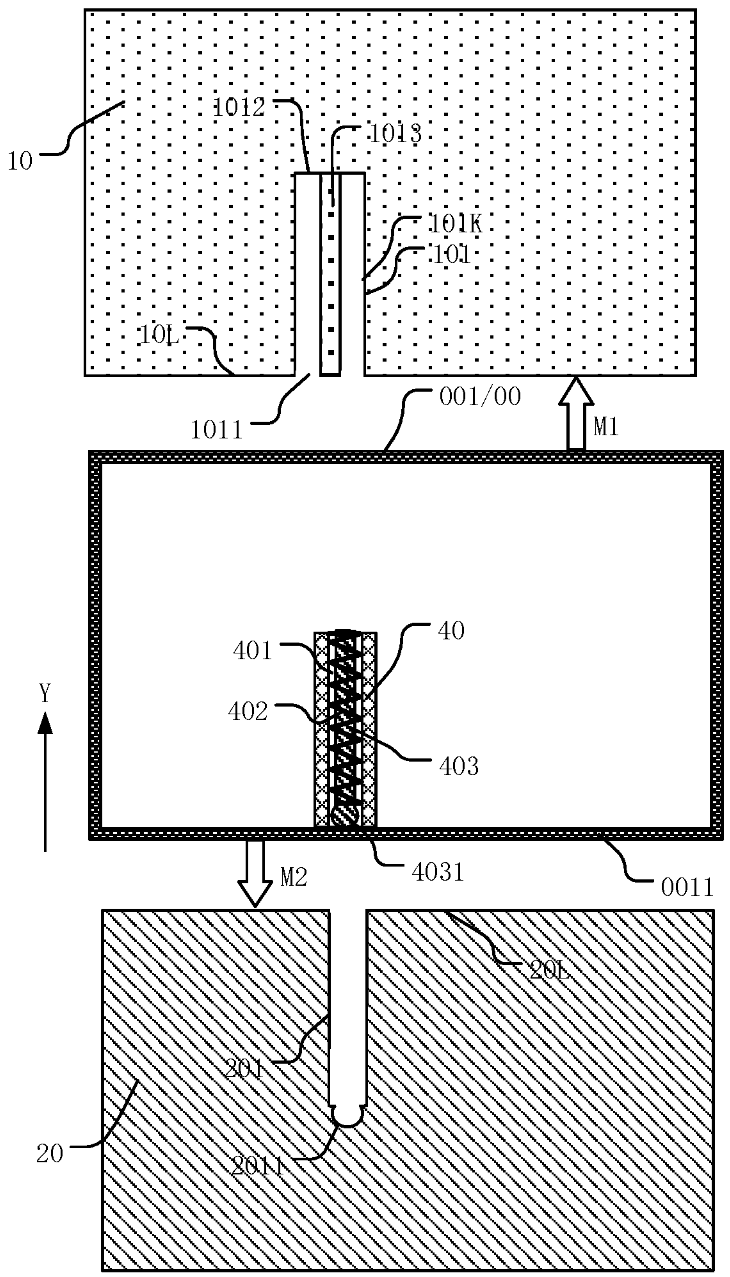
FIG. 9 illustrates another structure of a display device after disassembly in FIG. 8, consistent with various disclosed embodiments of the present disclosure.
Figure 10:
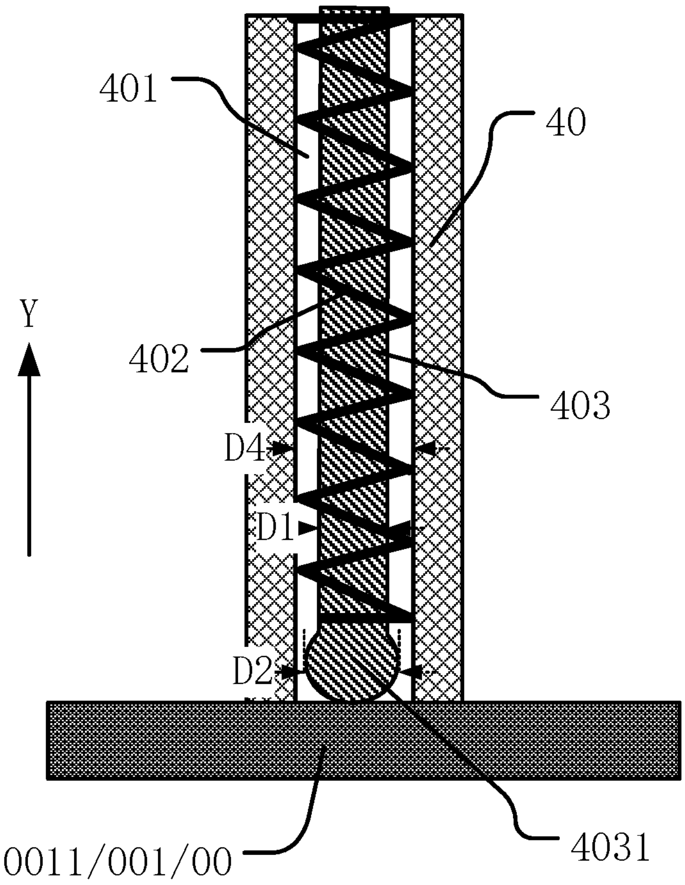
FIG. 10 illustrates a cross-sectional view of another first fixture of a first frame module in FIG. 9, consistent with various disclosed embodiments of the present disclosure.
Figure 11:
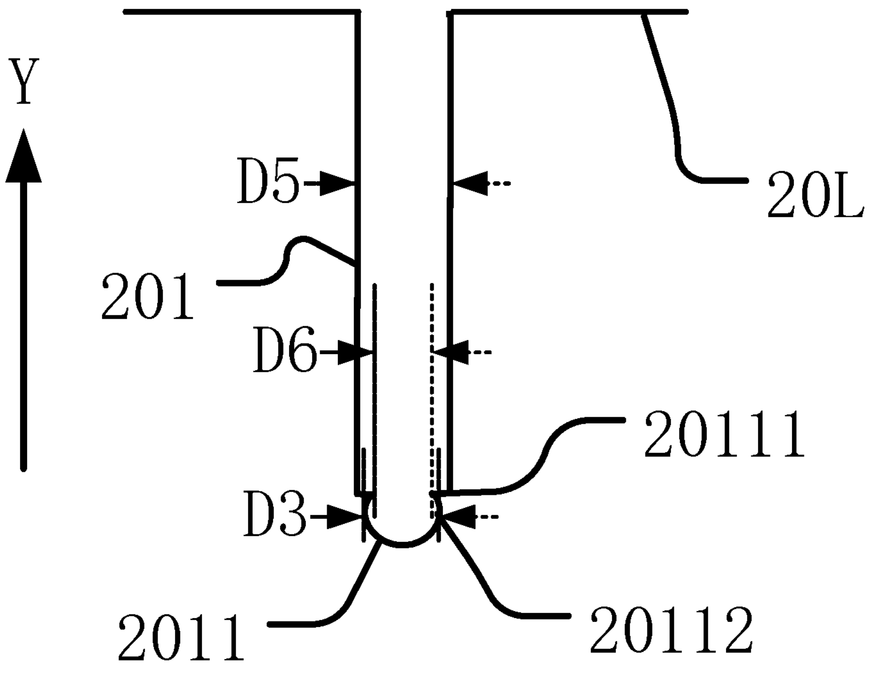
FIG. 11 illustrates a cross-sectional view of another first chute of a second display module in FIG. 9, consistent with various disclosed embodiments of the present disclosure.

In some other embodiments shown in FIG. 8 illustrating another exemplary display device, FIG. 9 illustrating another structure of a display device after disassembly in FIG. 8, FIG. 10 illustrating a cross-sectional view of another first fixture of a first frame module in FIG. 9, and FIG. 11 illustrating a cross-sectional view of another first chute of a second display module in FIG. 9, the end of the sliding rod 403 in the first fixture 40 facing the crossbar 0011 may include a first spherical plug 4031, and the bottom of the first chute 201 may include a first spherical groove 2011.

In the first state, the first spherical groove 2011 in the second display module 20 may be engaged and matched with the first spherical plug 4031 of the first fixture 40.

In the present embodiment, the first fixture 40 of the first frame unit 001 may be designed such that the end of the sliding rod 403 facing the crossbar 0011 may be provided with the first spherical plug 4031. Optionally, the first spherical plug 4031 may be a spherical structure, and arranged on the end of the sliding rod 403 facing the crossbar 0011. The bottom of the first chute 201 may include the first spherical groove 2011 matching the shape of the first spherical plug 4031. The bottom of the first chute 201 may be understood as the bottom of the first chute 201 on the side away from the crossbar 0011 in the first state. Through the first spherical plug 4031 and the first spherical groove 2011 with matched shapes, in the first state of the display device 000, after the sliding rod 403 of the first fixture 40 is pushed out by the pole 1013 of the first display module 10 to the outside of the chamber 401 and inserted into the first chute 201 of the second display module 20, the first spherical plug 4031 of the first fixture 40 and the first spherical groove 2011 of the second display module 20 may be engaged and matched, that is, the first spherical plug 4031 may be embedded in the first spherical groove 2011, to realize the stable assembly of the sliding rod 403 of the first fixture 40 and the second display module 20. The splicing stability of the first display module 10 and the second display module 20 in the first state and the flatness of the entire device may be improved.

As shown in FIG. 8, FIG. 10, and FIG. 11, in some embodiments, the outer diameter D1 of the sliding rod 403 of the first fixture 40 may be smaller than the maximum outer diameter D2 of the first spherical plug 4031, and the maximum outer diameter D3 of the first spherical groove 2011 may be equal to the maximum outer diameter D2 of the first spherical plug 4031. By setting the maximum outer diameter D2 of the first spherical plug 4031 at the end of the sliding rod 403 to be slightly larger than the outer diameter D1 of the shaft of the sliding rod 403, the first spherical plug 4031 may be engaged with the first spherical groove 2011 interferingly at the bottom of the first chute 301. When the first spherical plug 4031 is inserted into the first spherical groove 2011, it may need to pass through with a certain force, which is similar to an interference fit. The clamping of the sliding rod 403 of the first fixture 40 and the second display module 20 may be achieved, to improve the stability of the splicing of the first display module 10 and the second display module 20.

As shown in FIG. 8, FIG. 10, and FIG. 11, in some embodiments, to facilitate the sliding rod 403 including the first spherical plug 4031 to slide in the chamber 401, the inner diameter D4 of the chamber 401 in the first fixture 40 may be set to be larger than or equal to the maximum outer diameter D2 of the first spherical plug 4031. When the sliding rod 403 is pushed out from the chamber 401 by the pole 1013 of the first display module 10 and inserted into the first chute 201 of the second display module 20, to facilitate the sliding rod 403 including the first spherical plug 4031 to slide in the first chute 201, the inner diameter D5 of the first chute 201 may be set to be larger than or equal to the maximum outer diameter D2 of the first spherical plug 4031.

As shown in FIG. 8, FIG. 10, and FIG. 11, in some embodiments, the first spherical groove 2011 opened on the bottom of the second display module 20 may include a first portion 20111 and a second portion 20112. The second portion 20112 may be located on the side of the first portion 20111 away from the end 20L of the second display module 20. The second portion 20112 may be understood as a portion of the maximum outer diameter D3 of the first spherical groove 2011. The inner diameter D6 of the first spherical groove 2011 at the first portion 20111 may be smaller than D3. That is, when the first spherical plug 4031 of the sliding rod 403 is inserted to the first spherical groove 2011, it may first pass through the first portion 20111 with a smaller inner diameter, and then completely fit into the entire first spherical groove 2011, to ensure the interference clamping effect between the first spherical plug 4031 at the end of the sliding rod 403 and the first spherical groove 2011 of the second display module 20.

The sliding rod 403 included in the first fixture 40 may be made of a material including elastic rubber. Therefore, in the second state, when the sliding rod 403 retracts into the chamber 401, the elastic material structure of the sliding rod 403 itself may be able to facilitate the disengagement of the first spherical plug 4031 of the sliding rod 403 from the first spherical groove 2011, reducing the difficulty of disassembly.

Figure 12:
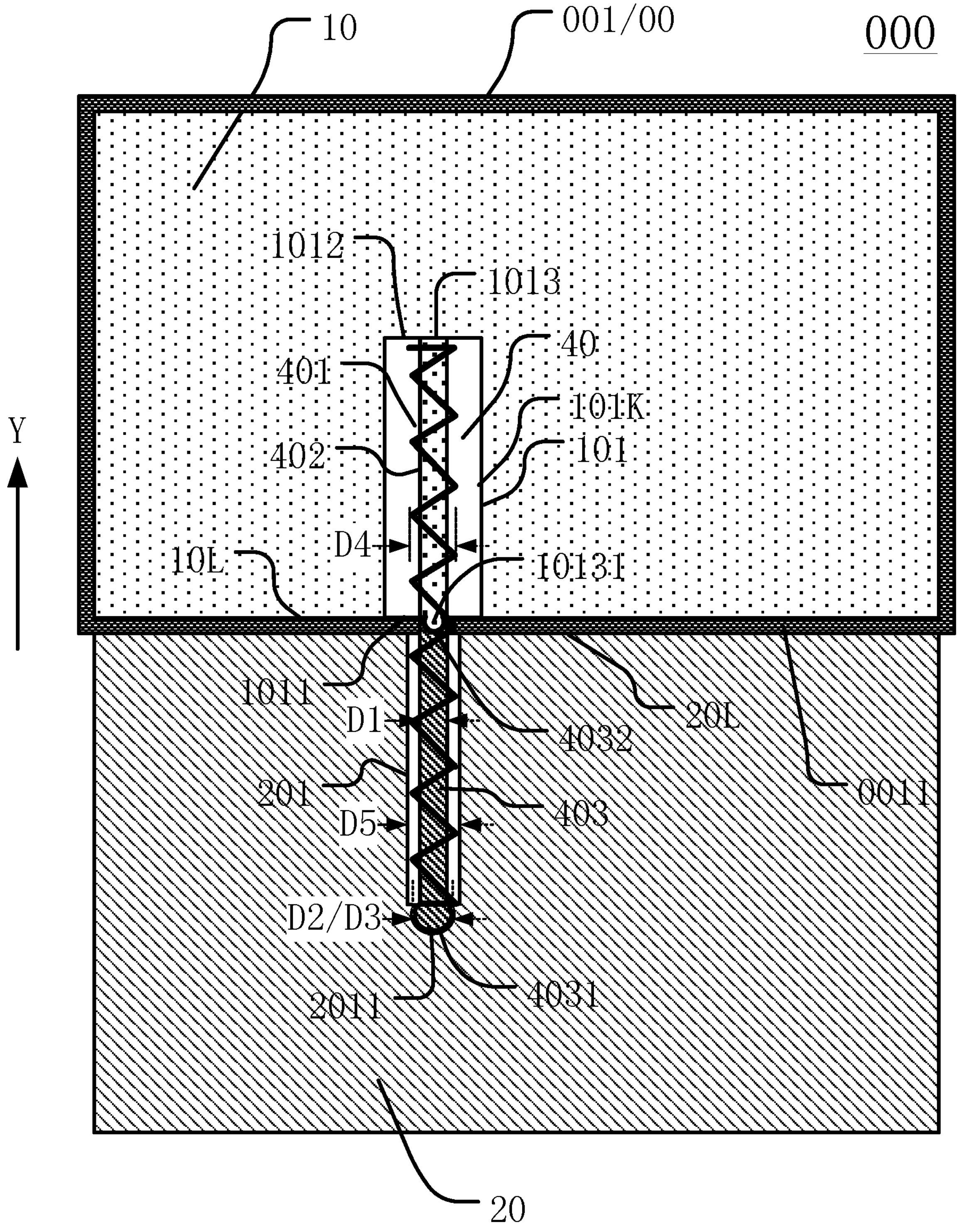
FIG. 12 illustrates another exemplary display device consistent with various disclosed embodiments of the present disclosure.
Figure 13:
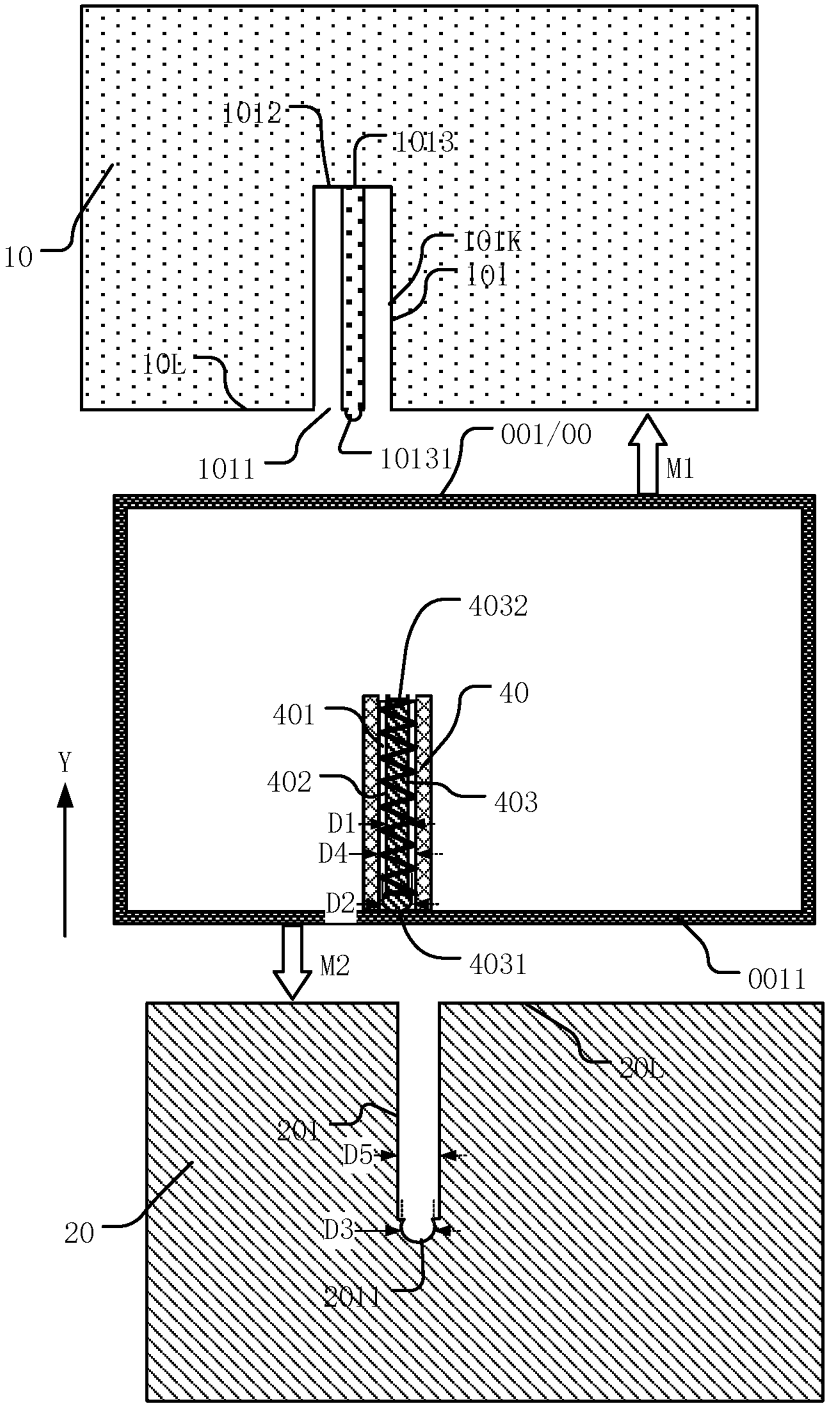
FIG. 13 illustrates another structure of a display device after disassembly in FIG. 12, consistent with various disclosed embodiments of the present disclosure.
Figure 14:
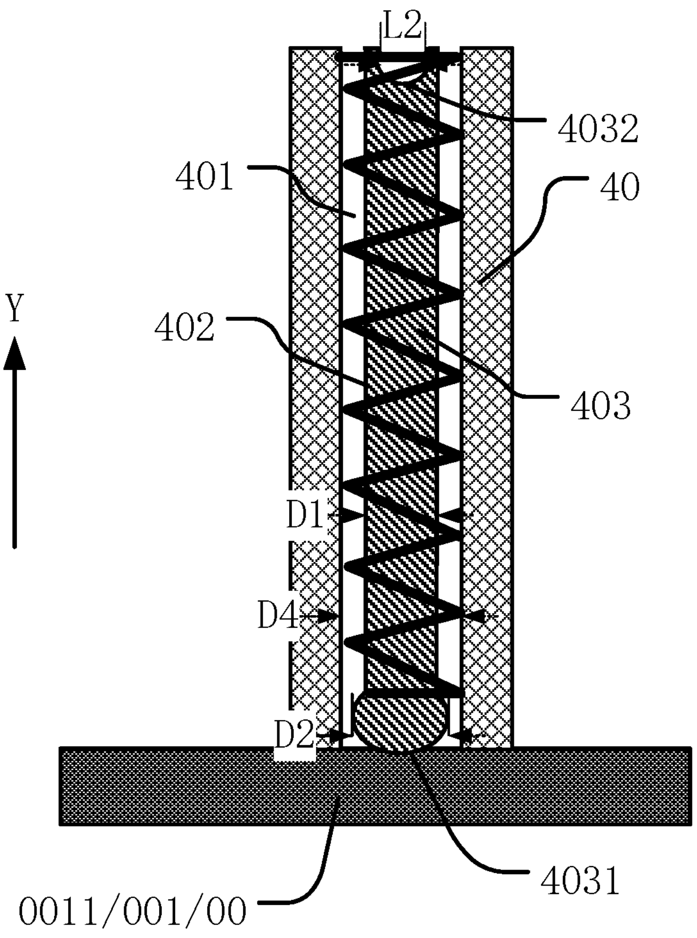
FIG. 14 illustrates a cross-sectional view of another first fixture of a first frame module in FIG. 13, consistent with various disclosed embodiments of the present disclosure.
Figure 15:
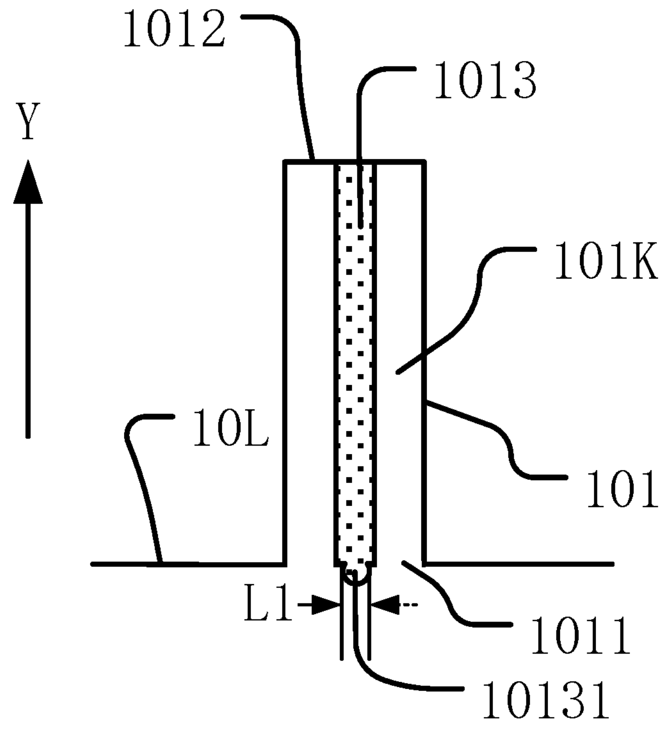
FIG. 15 illustrates a cross-sectional view of another first chute of a second display module in FIG. 13, consistent with various disclosed embodiments of the present disclosure.

In some other embodiments shown in FIG. 12 illustrating another exemplary display device, FIG. 13 illustrating another structure of a display device after disassembly in FIG. 12, FIG. 14 illustrating a cross-sectional view of another first fixture of a first frame module in FIG. 13, and FIG. 15 illustrating a cross-sectional view of another second chute of a first display module in FIG. 13 (the arrows M1 and M2 in FIG. 13 indicate the disassembly direction), the end of the sliding rod 403 in the first fixture 40 away from the crossbar 0011 may include a first spherical chamber 4032.

At the first end 1011 of the second chute 101, the end of the pole 1013 in the second chute 101 may include a second spherical plug 10131.

In the first state, the second spherical plug 10131 of the first display module 10 may be engaged and clamped with the first spherical chamber 4032 of the first fixture 40.

In the present embodiment, the first fixture 40 on the first frame unit 001 may be designed such that the end of the sliding rod 403 in the first fixture 40 away from the crossbar 0011 may include the first spherical chamber 4032. Optionally, the first spherical chamber 4032 may have a spherical structure, which is arranged on the end of the sliding rod 403 away from the crossbar 0011. The position where the pole 1012 is against the endo of the sliding rod 403 may be the position of the first end 1011 of the second chute 101. The end 1011 of the pole 1013 in the second chute 101 may include the second spherical plug 10131 that matches the shape of the first spherical chamber 4032. Through the second spherical plug 10131 and the first spherical chamber 4032 with matched shapes, in the first state of the display device 000, when the pole 1013 abuts against the sliding rod 403 and pushes the sliding rod 403 to the outside of the chamber 401, the second spherical plug 10131 of the pole 1013 may be engaged and clamped with the first spherical chamber 4032 of the sliding rod 403, that is, the second spherical plug 10131 may be clamped in the first spherical chamber 4032, to achieve stable splicing of the pole 1013 of the first display module 10 and the first fixture 40. The splicing stability of the first display module 10 and the first frame unit 001 in the first state may be improved.

Figure 16:
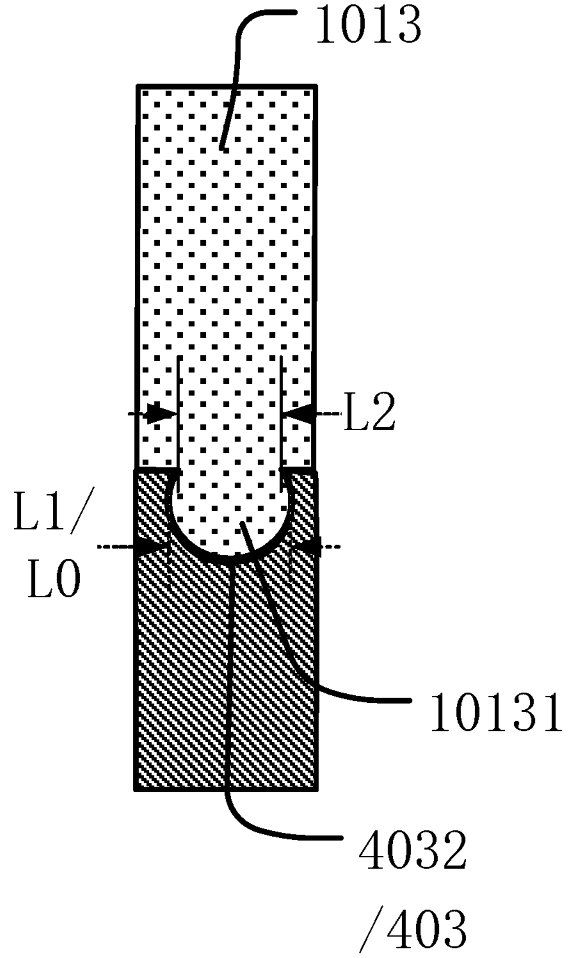
FIG. 16 illustrates a locally enlarged structure after a pole and a sliding rod are clamped, consistent with various disclosed embodiments of the present disclosure.

In some embodiments shown in FIG. 14, FIG. 15, and FIG. 16 illustrating a locally enlarged view after the pole is engaged with the sliding rod, in some embodiments, the maximum outer diameter of the second spherical plug 10131 may be L1, and the inner diameter of the first spherical chamber 4032 at the end of the first fixture 40 may be L2, where L1>L2. The inner diameter of the first spherical chamber 4032 at the position of the end of the first fixture 40 opened at the end of the sliding rod 403 may be L2, and the first spherical chamber 4032 may have a maximum inner diameter L0, and the position of the maximum inner diameter L0 may be at a side of the position of the inner diameter L2 away from the first fixture 40. The maximum inner diameter L0 of the first spherical chamber 4032 may be equal to the maximum outer diameter L1 of the second spherical plug 10131, and the maximum outer diameter L1 of the second spherical plug 10131 may be larger than L2. Therefore, when the pole 1013 abuts against the sliding rod 403 and the second spherical plug 10131 is inserted into the first spherical chamber 4032, it may need to pass through with a certain force, which is similar to an interference fit. The second spherical plug 10131 may first pass through the position of the first spherical chamber 4032 with the inner diameter L2, and then may be completely embedded in the whole first spherical chamber 4032, to ensure the interference fit between the second spherical plug 10131 at the end of the pole 1013 and the first spherical chamber 4032 of the sliding rod 403.

The pole 1013 included in the second chute 101 may be made of a material including elastic rubber. Therefore, in the second state, when the second spherical plug 10131 of the pole 1013 is pulled out from the first spherical chamber 4032 of the sliding rod 403, the elastic material structure of the sliding rod 403 itself may be able to facilitate the disengagement of the second spherical plug 10131 of the pole 1013 and the first spherical chamber 4032 of the sliding rod 403, reducing the difficulty of disassembly.

In some embodiments shown in FIG. 12 to FIG. 16 and FIG. 17 illustrating a locally enlarged view of the first fixture in FIG. 13, a protrusion 404 may be provided on the inner wall of the end of the chamber 401 near the crossbar 0011, and a blocker 405 may be provided at the end of the chamber 401 away from the crossbar 0011.

In the present embodiment, when the first fixture 40 is fixed on the crossbar 0011 of the first frame unit 001, the structure of the chamber 401 inside the first fixture 40 for accommodating the elastic component 402 and the sliding rod 403 may include the protrusion 404 on the inner wall of the end of the chamber 401 near the crossbar 0011 and the blocker 405 on the inner wall of the other end of the chamber 401 away from the crossbar 0011. The first spherical plug 4031 of the sliding rod 403 and the protrusion structure 404 on the inner wall of the chamber 401 may be interference fit structures. During the process of the sliding rod 403 being pushed out of the chamber 401 by the pole 1013, that is, during the process of splicing the display module, a certain force may be necessary to make the sliding rod 403 slide along the first direction Y, and the first spherical plug 4031 of the sliding rod 403 may slide out toward the second display module 20 over the protrusion 404 on the inner wall of the chamber 401. When the sliding rod 403 is pulled back into the chamber 401 by the elastic component 402, that is, in the process of disassembling the display module, the first spherical plug 4031 of the sliding rod 403 may reversely cross the protrusion 404 on the inner wall of the chamber 401 and return to the chamber 401 above the protrusion 404. The sliding rod 403 may be prevented from returning to the outside of the chamber 401. Further, the blocker 405 may be set on the inner wall of the other end of the chamber 401 away from the crossbar 0011. The limitation of the blocker 405 may prevent the sliding rod 403 from continuing moving upward and sliding out of the chamber 401. Even the second spherical plug 10131 of the pole 1013 and the first spherical chamber 4032 of the sliding rod 403 are engaged very tightly, when the second spherical plug 10131 of the pole 1013 is pulled out from the first spherical chamber 4032 of the sliding rod 403, the limitation of the blocker 405 may prevent the sliding rod 403 from being pulled out of the chamber 401 by the pole 1013, which is beneficial to ensure the disassembly and assembly effect of the modules.

Optionally, the surface of the protrusion 404 in this embodiment may have a smooth surface. Therefore, in the process of splicing the display modules, a certain force may be applied to make the sliding rod 403 slide along the first direction Y. The first spherical plug 4031 may pass over the protrusion 404 on the inner wall of the chamber 401 and slide out of the chamber 401 toward the direction close to the second display module 20 more smoothly, facilitating the splicing of the modules.

Figure 17:
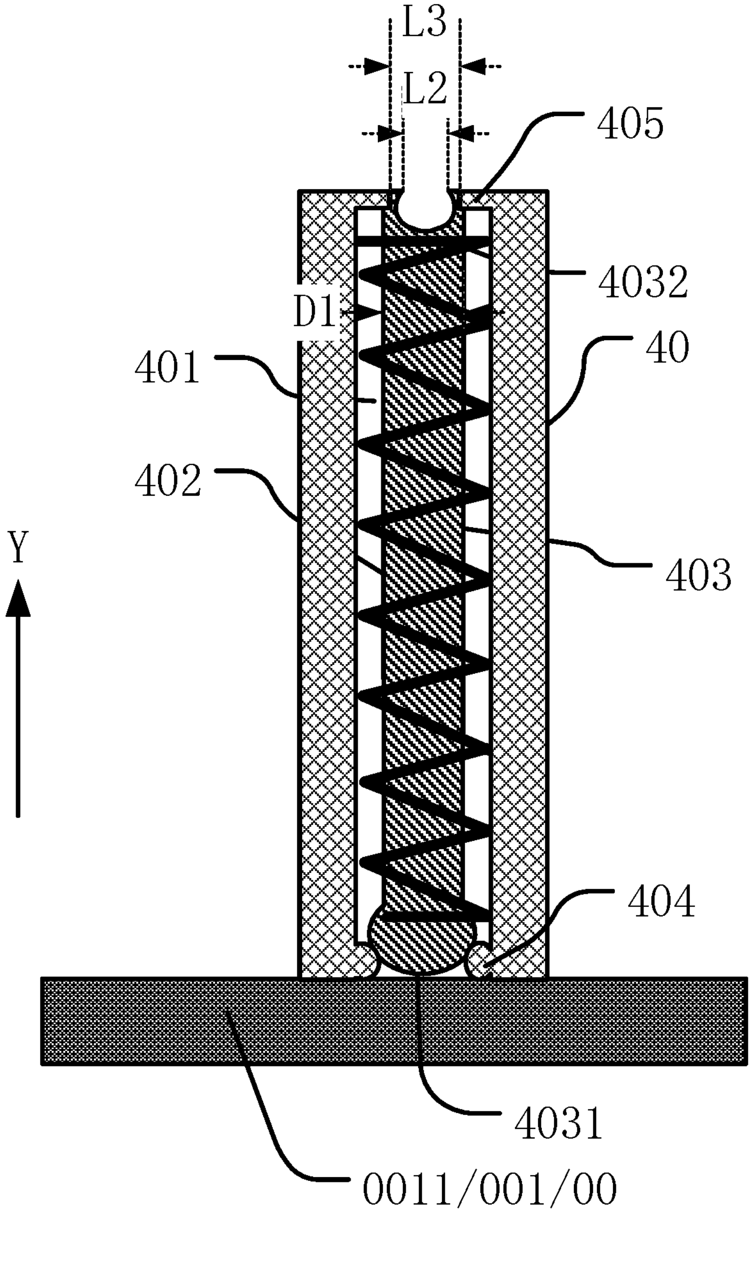
FIG. 17 illustrates a locally enlarged structure of a first fixture in FIG. 13, consistent with various disclosed embodiments of the present disclosure.

Optionally, as shown in FIG. 15 and FIG. 17, the maximum outer diameter L1 of the second spherical plug 10131 on the pole 1013 in this embodiment may be smaller than the inner diameter L3 of the chamber 401 at the position of the blocker 405. The pole 1013 may be smoothly detached from the first fixture 40 during the process of pulling out the pole 1013 from the chamber 401, facilitating the disassembly.

In this embodiment, as shown in FIG. 17, the inner diameter L3 of the chamber 401 at the position of the blocker 405 may be smaller than the outer diameter D1 of the shaft of the sliding rod 403. Therefore, the limitation of the blocker 405 may prevent the sliding rod 403 from being pulled out from the chamber 401 by the pole 1013, which is beneficial to ensure the disassembly and assembly effect of the modules.

In some embodiments shown in FIG. 1 to FIG. 7, the first chute 201 of the second display module 20 may include a third end 20101 and a fourth end 20102 opposite in the first direction Y. The third end 20101 may pass through the end 20L of the second display module 20.

In the first state, the first end 1011 of the second chute 101 of the first display module 10 may be opposite to the third end 20101 of the first chute 201 of the second display module 20. Further, along the first direction Y, the first end 1011 of the second chute 101 of the first display module 10 and the third end 20101 of the first chute 201 of the second display module 20 may extend along the same straight line.

In the present embodiment, the first display module 10 may include the second chute 101. The second chute 101 may extend along the first direction Y, and may include the first end 1011 and the second end 1012 opposite to each other along the first direction Y. The first end 1011 may pass through the end 10L of the first display module 10. The first chute 201 of the second display module 20 may include the third end 20101 and the fourth end 20102 opposite to each other along the first direction Y. The third end 20101 may be connected to the end 20L of the second display module 20. After the first display module 10 and the second display module 20 of the display device 000 are spliced through the first fixture 40 of the first frame unit 001, that is, in the first state, the first end 1011 of the second chute 101 of the first display module 10 and the third end 20101 of the first chute 201 of the second display module 20 may be oppositely arranged. Further, along the first direction Y, the first end 1011 of the second chute 101 of the first display module 10 and the third end 20101 of the first chute 201 of the second display module 20 may extend along the same straight line, and the position of the second chute 101 of the first display module 10 may be consistent with the position of the first chute 201 of the second display module 20. The pole 1013 and the sliding rod 403 may form a linear structure inserted in the chamber 401 of the first fixture 40 and the first chute 201, to ensure the stability and flatness of the first display module 10 and the second display module 20 in the spliced state.

Figure 18:
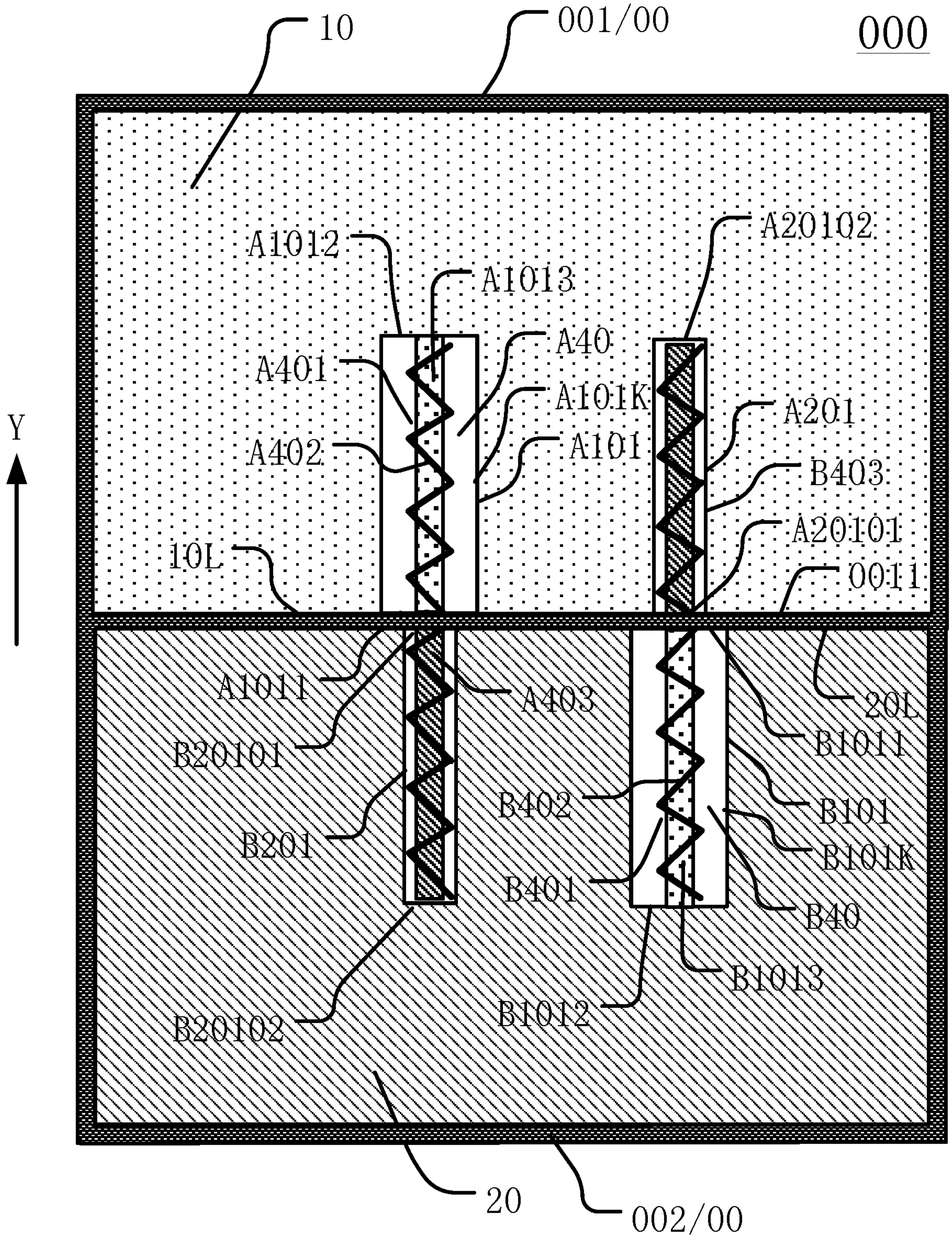
FIG. 18 illustrates another exemplary display device consistent with various disclosed embodiments of the present disclosure.
Figure 19:
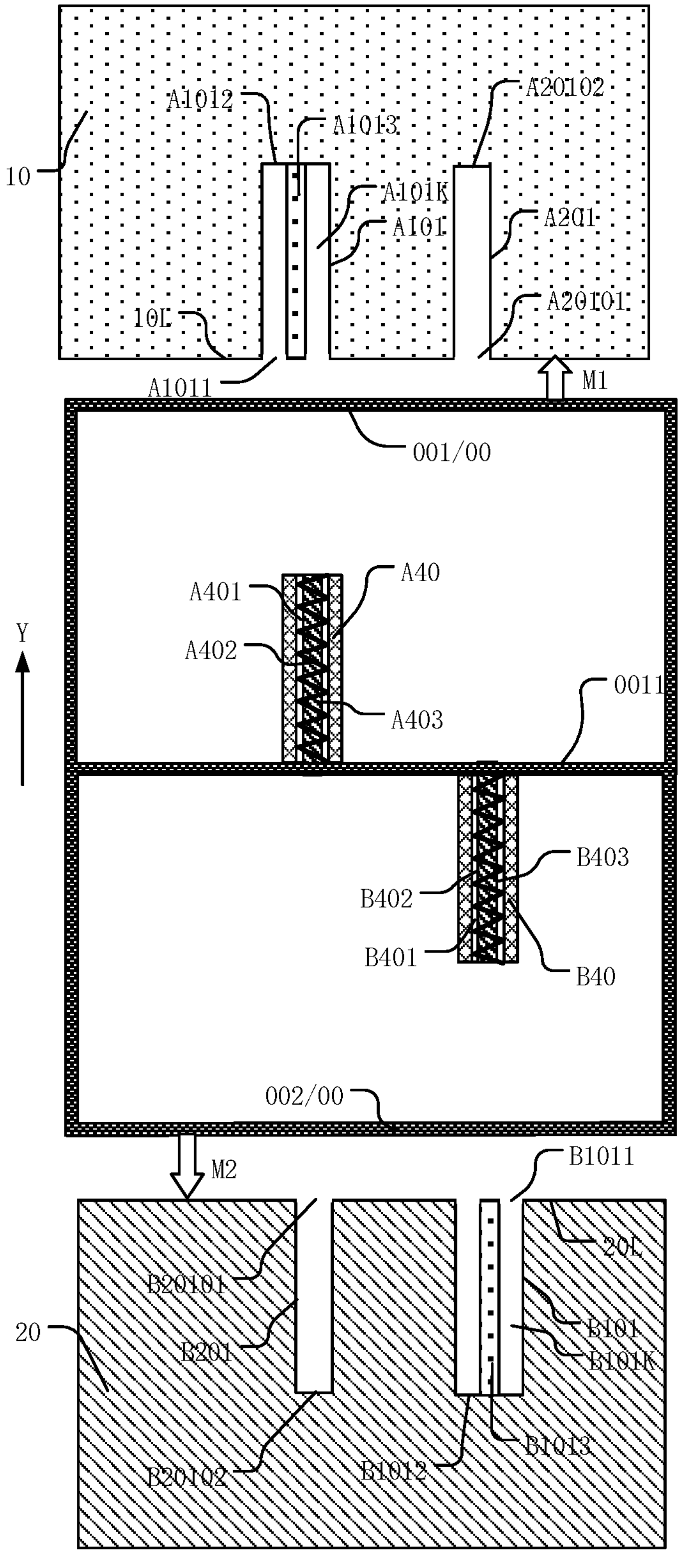
FIG. 19 illustrates another structure of a display device after disassembly in FIG. 18, consistent with various disclosed embodiments of the present disclosure.
Figure 20:
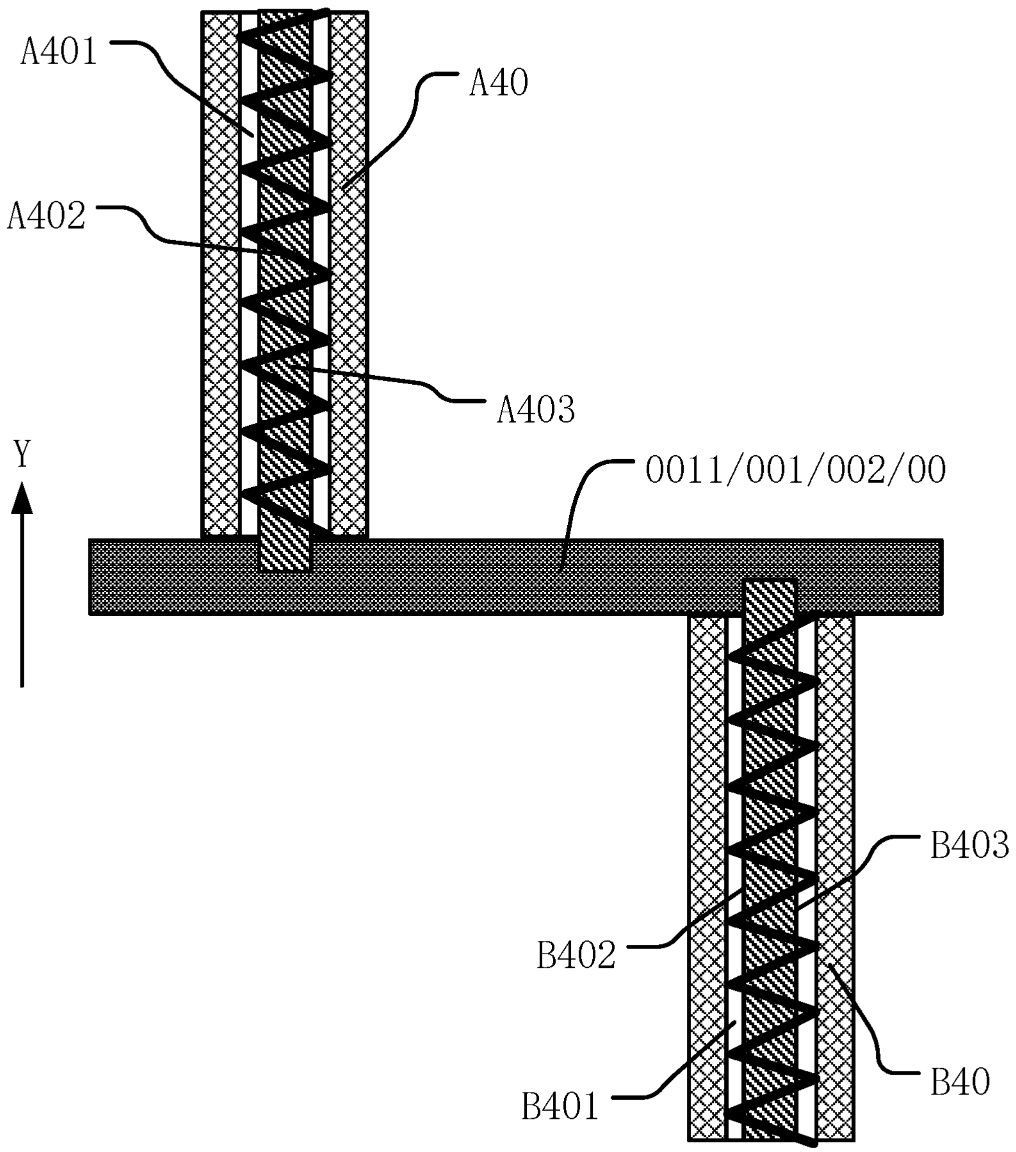
FIG. 20 illustrates a cross-sectional view of a first fixture and a second fixture of a frame in FIG. 19, consistent with various disclosed embodiments of the present disclosure.
Figure 21:
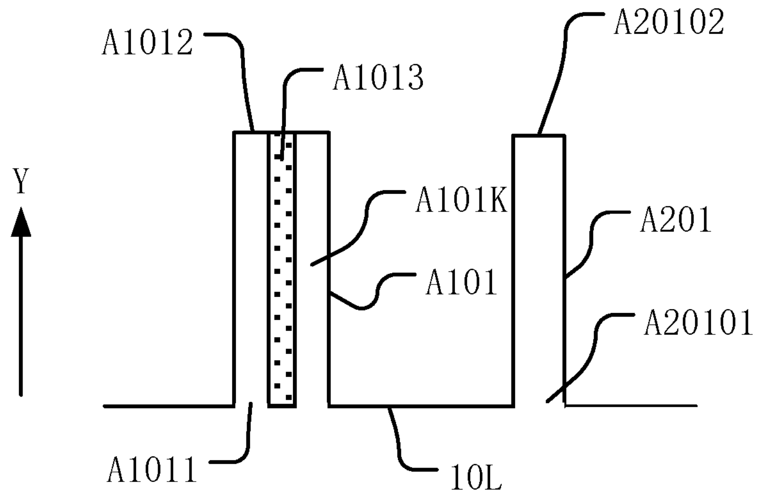
FIG. 21 illustrates a cross-sectional view of a first chute and a second chute of a first display module in FIG. 19, consistent with various disclosed embodiments of the present disclosure.
Figure 22:
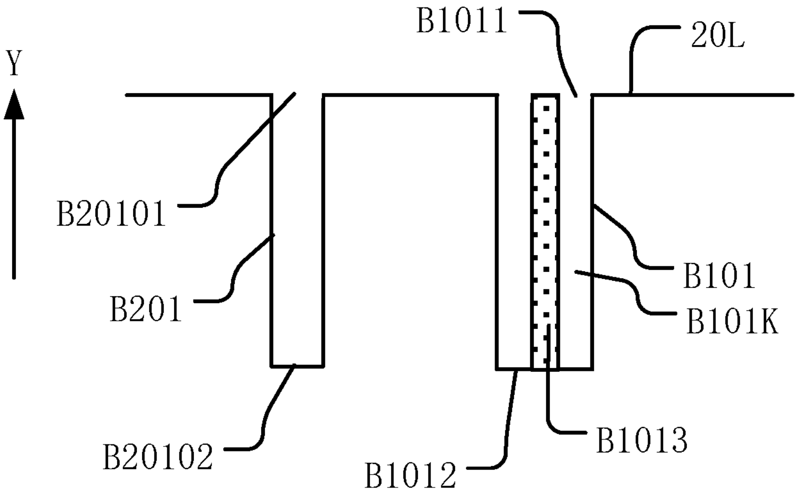
FIG. 22 illustrates a cross-sectional view of a first chute and a second chute of a second display module in FIG. 19, consistent with various disclosed embodiments of the present disclosure.

In some other embodiments shown in FIG. 18 illustrating another exemplary display device, FIG. 19 illustrating another structure of a display device after disassembly in FIG. 18, FIG. 20 illustrating a cross-sectional view of another first fixture and a second fixture of the frame in FIG. 19, FIG. 21 illustrating a cross-sectional view of a second chute and a first chute of a first display module in FIG. 19, and FIG. 22 illustrating a cross-sectional view of a first chute and a second chute of a second display module in FIG. 19 (the arrows M1 and M2 in FIG. 19 indicate the disassembly direction), the frame 00 may further include a second frame unit 002, and the second frame unit 002 may include a second fixture. The second fixture may have the same structure as the first fixture 40. Since the second fixture may have the same structure as the first fixture 40, to distinguish clearly the structure included in the second fixture and the structure included in the first fixture 40, in this embodiment and subsequent embodiments, the labels of the structures included in the first fixture 40 are prefixed with A. For example, the first fixture is labeled as A40, and the first fixture A40 may include a chamber A401, an elastic component A402, and a sliding rod A403. The labels of the structures included in the second fixture are all prefixed with B. For example, the second fixture is labeled as B40, and the second fixture B40 may include a chamber B401, an elastic component B402, and a sliding rod B403. Therefore, the first fixture on the first frame unit 001 may be distinguished from the second fixture on the second frame unit 002 by labels.

The first frame unit 001 and the second frame unit 002 may share the same crossbar 0011, and may cooperate to form the structure of the frame 00. The first fixture A40 may be fixedly arranged on the side of the crossbar 0011 facing the first frame unit 001, and the second fixture B40 may be fixedly disposed on the side of the crossbar 0011 facing the second frame unit 002. In the first state, the second display module 20 may be installed in the second frame unit 002 through the second fixture B40.

Optionally, the first display module 10 may further include a first chute, and the second display module 20 may further include a second chute. The structure of the first chute of the first display module 10 may be consistent with the structure of the first chute of the second display module 20, and the structure of the second chute included in the second display module 20 may be the same as that of the second chute included in the first display module 10.

Since the structure of the first chute included in the first display module 10 is the same as that of the first chute included in the second display module 20, to distinguish the structure of the first chute included in the second display module 20 and the first chute included in the first display module 10, in this embodiment and subsequent embodiments, the labels of the structure of the first chute included in the first display module 10 are all prefixed with A. That is, the first display module 10 may include the first chute A201, and at least one end of the first chute A201 may pass through the end 10L of the first display module 10. The labels of the structure of the first chute included in the second display module 20 are all prefixed with B. For example, the second display module 20 may include the first chute B201, and at least one end of the first chute B201 may be connected with the end 20L of the second display module 20. The first chute of the first display module 10 and the first chute of the second display module 20 are distinguished therefore.

Since the structure of the second chute included in the first display module 10 is the same as that of the second chute included in the second display module 20, to distinguish the structure of the second chute included in the second display module 20 and the second chute included in the first display module 10, in this embodiment and subsequent embodiments, the labels of the structure of the second chute included in the first display module 10 are all prefixed with A. That is, the first display module 10 may include the second chute A101, and the second chute A101 may include the first end A1011 and the second end A1012 opposite in the first direction Y. The first end A1011 may be connected to the end 10L of the first display module 10. The second chute A101 may be provided with the pole A1013, and one end of the pole A1013 may be fixed to the second end A1012. The pole A1013 may extend along the first direction Y. The labels of the structure of the second chute included in the second display module 20 are all prefixed with B. That is, the second display module 20 may include the second chute B101, and the second chute B101 may include the first end B1011 and the second end B1012 opposite in the first direction Y. The first end B1011 may be connected to the end 20L of second first display module 20. The second chute B101 may be provided with the pole B1013, and one end of the pole B1013 may be fixed to the second end B1012. The pole B1013 may extend along the first direction Y. The second chute of the first display module 10 and the second chute of the second display module 20 are distinguished therefore.

In the present embodiment, when the display device is in the first state, that is, in the splicing state, the first fixture A40 may be nested in the second chute A101 of the first display module 10, the pole A1013 of the first display module 10 may be inserted into the chamber A401 of the first fixture A40, and the pole A1013 of the first display module 10 may push out the sliding rod A403 of the first fixture A40. Therefore, the sliding rod A403 of the first fixture A40 may be inserted into the first chute B201 of the second display module 20, and the second fixture B40 may be nested in the second chute B101 of the second display module 20. The pole B1013 of the second display module 20 may be inserted into the chamber B401 of the second fixture B40, and the pole B1013 of the second display module 20 may push out the sliding rod B403 of the second fixture B40. Therefore, the sliding rod B403 of the second fixture B40 may be inserted into the first chute A201 of the first display module 10.

In the present embodiment, the display device may have the first state and the first state may be the state after splicing the first display module 10 and the second display module 20 of the display device, as shown in FIG. 18. When the display device 000 is spliced from the disassembled state shown in FIG. 19 to the first state shown in FIG. 18, the first display module 10 may be fixed on the crossbar 0011 of the first frame unit 001 of the frame 00 through the first fixture A40 nested in the second chute A101 of the first display module 10. Since there is a first space A101K between the pole A1013 in the second chute A101 and the side wall of the second chute A101, the first fixture A40 may be able to be inserted into the first space A101K, and the pole A1013 in the second chute A101 of the first display module 10 may be inserted into the chamber A401 of the first fixture A40. Therefore, the pole A1013 may push out the sliding rod A403 of the first hardware A40. Because of the stretching effect of the elastic component A402, although the sliding rod A403 may be pushed out from the chamber A401 of the first fixture A40, it may be still in a state that is movably connected with the elastic component A402 (as shown in FIG. 18). After the sliding rod A403 is pushed out from the chamber A401 of the first fixture A40, the sliding rod A403 may continue to be inserted into the first chute B201 of the second display module 20 along the first direction Y, such that the second display module 20 is spliced and fixed with the first display module 10 through the insertion and connection between the sliding rod A403 pushed out to the outside of the chamber A401 of the first fixture A40 and the first chute B201. Further, the second fixture B40 may be nested in the second chute B101 of the second display module 20, such that the second display module 20 is fixed on the crossbar 0011 of the second frame unit 002 of the frame 00 through the second fixture B40. Since there is a first space B101K between the pole B1013 in the second chute B101 and the side wall of the second chute B101, the second fixture B40 may be able to be inserted into the first space B101K. The pole B1013 in the second chute B101 of the second display module 20 may be inserted into the chamber B401 of the second fixture B40, and the pole B1013 may push out the sliding rod B403 of the second fixture B40. Because of the stretching effect of the elastic component B402, although the sliding rod B403 is pushed out from the chamber B401 of the second fixture B40, it may still maintain a state which is movably connected with the elastic component B402 (as shown in FIG. 18). After the sliding rod B403 is pushed out from the chamber B401 of the second fixture B40, the sliding rod B403 may continue to be inserted into the first chute A201 of the first display module 10 along the first direction Y, such that the first display module 10 may be spliced and fixed with the second display module 20 through the insertion of the sliding rod B403 pushed out to the outside of the chamber B401 of the second fixture B40 and the first chute A201, to form the splicing structure shown in FIG. 18.

The splicing structure in the present embodiment may make the gap between the spliced first display module 10 and the second display module 20 minimized, and the stability between the spliced first display module 10 and the second display module 20 may be improved. Also, the overall flatness may be improved, to enhance the user's viewing effect. By opening the second chute A101 and the first chute A201 on the first display module 10, disposing the first fixture A40 and the second fixture B40 on the frame 00, and setting up the first chute B201 and the second chute B101 on the second display module 10, these simple structures may be used to realize the splicing effect. Therefore, the operation may be simple and time-consuming may be small, which greatly reduces the corresponding adjustment time between each display module. Further, the cooperation between the mechanism components may be smooth, which may effectively reduce the difficulty of splicing and ensure the splicing effect. Moreover, the setting of the first fixture A40 and the second fixture B40 may make the spliced first display module 10 and the second display module 20 more stable and reliable, further improving the stability and flatness of the spliced modules.

In some embodiments, as shown in FIG. 18 to FIG. 22, the display device 000 may have a second state. When the display device 000 is in the second state, that is, in the disassembled state, the pole A1013 of the first display module 10 may be pulled out from the chamber A401 of the first fixture A40, and the first display module 10 may be separated from the first fixture A40. The sliding rod A403 of the first fixture A40 may retract from the first chute B201 of the second display module 20 into the chamber A401 of the first fixture A40, and the second display module 20 may be separated from the first fixture A40. The pole B1013 of the second display module 20 may be pulled out from the chamber B401 of the second fixture B40, and the second display module 20 may be separated from the second fixture B40. The sliding rod B403 of the second fixture B40 may be retracted from the first chute A201 of the first display module 10 into the chamber B401 of the second fixture B40, and the first display module 10 may be separated from the second fixture B40.

In the present embodiment, the display device 000 may have the second state, and the second state may be understood as a disassembled state of the display device 000 as shown in FIG. 19. When the display device 000 is disassembled from the first state shown in FIG. 18 to the second state shown in FIG. 19, the pole A1013 in the second chute A101 included in the first display module 10 may be pulled out from the chamber A401 of the first fixture A40 in the first frame unit 001, such that the first display module 10 is separated from the first fixture A40. After the pole A1013 is pulled out from the chamber A401, under the reset and retraction action of the connected elastic component A402, the sliding rod A403 of the first fixture A40 may also be pulled back from the first chute B201 of the second display module 20 because of the elastic retraction action, and retracted into the chamber A401 of the first fixture A40, therefore separating the second display module 20 from the first fixture A40. Meanwhile, the pole B1013 in the second chute B101 included in the second display module 20 may be pulled out from the chamber B401 of the second fixture B40 in the second frame unit 002, such that the second display module 20 is separated from the second fixture B40. Under the reset and retraction action of the elastic component B402, the sliding rod B403 of the second fixture B40 may also be pulled back from the first chute A201 of the first display module 10 due to the elastic retraction, and retracted into the chamber B401 of the second fixture B40. Therefore, the first display module 10 may be separated from the second fixture B40, to disassemble and separate the first display module 10 from the first frame unit 001, and to disassemble and separate the second display module 20 from the second frame unit 002 at the same time.

Adopting the disassembly structure that is able to be assembled and disassembled in the present embodiment may minimize the gap between the first display module 10 and the second display module 20 after splicing, improve the stability of the first display modules 10 and the second display module 20 after splicing, and improve the overall flatness and the user's viewing effect. Further, the disassembly process may be simple and time-consuming may be small, therefore reducing the corresponding adjustment time between the display modules. The disassembly process may be greatly simplified. In the process of assembly and disassembly, the cooperation between the various mechanism parts may be smooth, and the difficulty of splicing and disassembly may be reduced, to ensure the splicing effect and improve the disassembly efficiency at the same time.

The first fixture A40 and the second fixture B40 may have the same structure, but the direction in which the sliding rods protrude after being pushed out by the pole may be opposite during the splicing process of the first display module 10 and the second display module 20. That is, the sliding rod A403 pushed out by the pole A1013 may protrude toward the direction close to the second display module 20, and the sliding rod B403 pushed out by the pole B1013 may protrude toward the direction close to the first display module 10, to splicing the first display module 10 and the second display module 20.

In one embodiment, along the first direction Y, the crossbar 0011 may include a first side facing the first display module 10 and a second side facing the second display module 20. One end of the first fixture A40 may be fixed on the first side of the crossbar 0011, and the other end of the first fixture A40 may face the side away from the crossbar 0011 and may be away from the second display module 20. When one end of the first fixture A40 is fixed on the first side of the crossbar 0011, the sliding rod A403 of the first fixture A40 and the elastic component A402 may be not fixed to the crossbar 0011, and it may be only necessary to ensure that the main body of the first fixture A40 is fixed to the first side of the crossbar 0011. One end of the second fixture B40 is fixed on the second side of the crossbar 0011. The other end of the second fixture B40 may face the side away from the crossbar 0011 and may be away from the first display module 10. When one end of the second fixture B40 is fixed to the second side of the crossbar 0011, the sliding rod B403 and the elastic part B402 of the second fixture B40 may be not fixed to the crossbar 0011, it may be only necessary to ensure the main body of the second fixture B40 is fixed to the crossbar 0011 on the second side. Optionally, only a portion of the end of the first fixture A40 may be fixed to the crossbar 0011, exposing the sliding rod A403 and the elastic piece A402 of the first fixture A40 to be inserted into the first chute B201 of the second display module 20 during splicing. In some other embodiments, a through hole may also be opened on the crossbar 0011, such that the sliding rod A403 and the elastic component A402 of the first fixture A40 may be able to pass through the through hole and be inserted into the first chute B201 of the second display module 20. In the same way, only a portion of the end of the second fixture B40 may be fixed to the crossbar 0011, exposing the sliding rod B403 and the elastic piece B402 of the second fixture B40 to be inserted into the first chute A201 of the first display module 10 during splicing. In some other embodiments, a through hole may also be opened on the crossbar 0011, such that the sliding rod B403 and the elastic component B402 of the second fixture B40 may be able to pass through the through hole and be inserted into the first chute A 201 of the first display module 10. The present embodiment does not specifically limit the fixing structure of the first fixture A40 and the crossbar 0011, and the fixing structure of the second fixture B40 and the crossbar 0011, which may be selected and set according to actual needs during specific implementation.

In some embodiments, the first chute A201 provided on the first display module 10 may be a cylindrical chute structure matching the sliding rod B403 of the second fixture B40, and the first chute B201 provided on the second display module 10 may be a cylindrical chute structure matching the sliding rod A403 of the first fixture A40. The inner wall of the cylindrical chute may be able to facilitate smoother insertion and extraction of the sliding rod and reduce disassembly resistance. The second chute A101 of the first display module 10 in this embodiment may be a cylindrical chute structure matching the main body of the first fixture A40. The inner wall of the cylindrical groove and the cylindrical main body of the first fixture A40 may facilitate the insertion and extraction of the main body of the first fixture A40 in the second chute A101. Similarly, the second chute B101 of the second display module 10 may be a cylindrical chute structure matching the main body of the second fixture B40. The inner wall of the cylindrical groove and the cylindrical main body of the second fixture B40 may facilitate the insertion and extraction of the main body of the second fixture B40 in the second chute B101, making the assembly action smoother and reducing disassembly resistance.

In some other embodiments as shown in FIG. 18 to FIG. 22, the first display module 10 may include a second chute A101 extending along the first direction Y. The second chute A101 may include a first end A1011 and a second end A1012 opposite to each other in the first direction Y. The first end A1011 may be connected to the end 10L of the first display module 10. The first chute B201 of the second display module 20 may include a third end B20101 and a fourth end B20102 opposite to each other in the first direction Y. The third end B20101 may be connected to the end 20L of the second display module 20. The second display module 20 may include a second chute B101, and the second chute B101 may extend along the first direction Y. The second chute B101 may include a first end B1011 and a second end B1012 opposite to each other along the first direction. The first end B1011 may be connected to the end 20L of the second display module 20. The first chute A201 may also include a third end A20101 and a fourth end A20102 opposite to each other along the first direction. The third end A20101 may be connected to the end 10L of the first display module 10.

In the first state, the first end A1011 of the second chute A101 of the first display module 10 may be opposite to the third end B20101 of the first chute B201 of the second display module 20. Along the first direction Y, the first end A1011 of the second chute A101 of the first display module 10 and the third end B20101 of the first chute B201 of the second display module 20 may extend along the same straight line. The first end B1011 of the second chute B101 of the second display module 20 may be opposite to the third end A20101 of the first chute A201 of the first display module 10, and the first end B1011 of the second chute B101 of the second display module 20 and the third end A20101 of the first chute A201 of the first display module 10 may extend along the same straight line along the first direction Y.

In the present embodiment, in the display device 000, the first display module 10 may include the first chute A201 and the second chute A101, and the second display module 20 may include the first chute B201 and the second chute B101. The first chute A201 of the first display module 10 and the first chute B201 of the second display module 20 may have the same structures, and the second chute A101 of the first display module 10 may have the same structure as the second chute B101 of the second display module 20. The first chute A201 of the first display module 10 may be opposite to the second chute B101 of the second display module 20, and the second chute A101 of the first display module 10 may be opposite to the first chute B201 of the second display module 20. The pole A1013 and the sliding rod A403 of the first display module 10 may form a linear structure inserted in the chamber A401 of the first fixture A40 and the first chute B201. The pole B1013 and the sliding rod B403 of the second display module 20 may form a linear structure that is inserted into the chamber B401 of the second fixture B40 and the first chute A201, further ensuring the stability and flatness of the first display module 10 and the second display module 20 in the spliced state.

Figure 23:
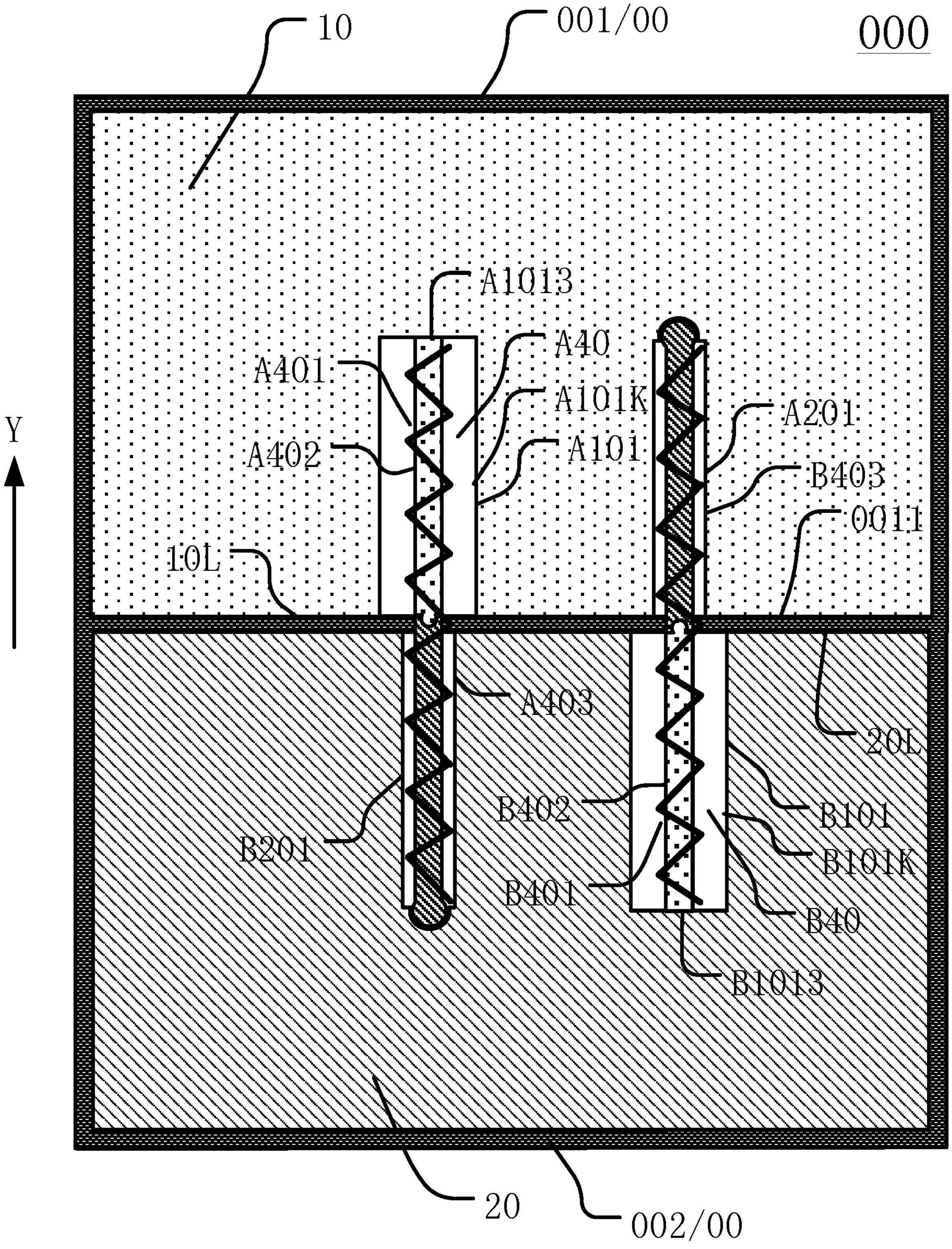
FIG. 23 illustrates another exemplary display device consistent with various disclosed embodiments of the present disclosure.
Figure 24:
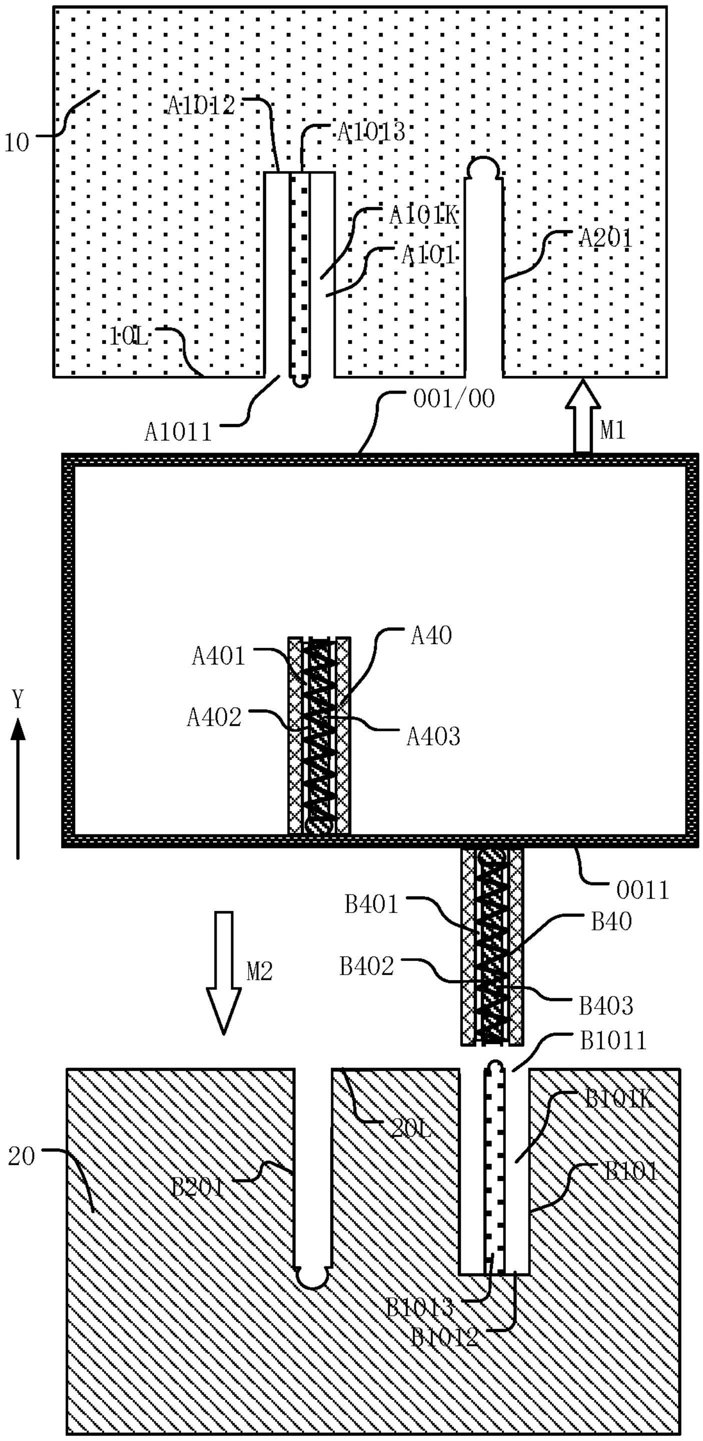
FIG. 24 illustrates another structure of a display device after disassembly in FIG. 23, consistent with various disclosed embodiments of the present disclosure.
Figure 25:
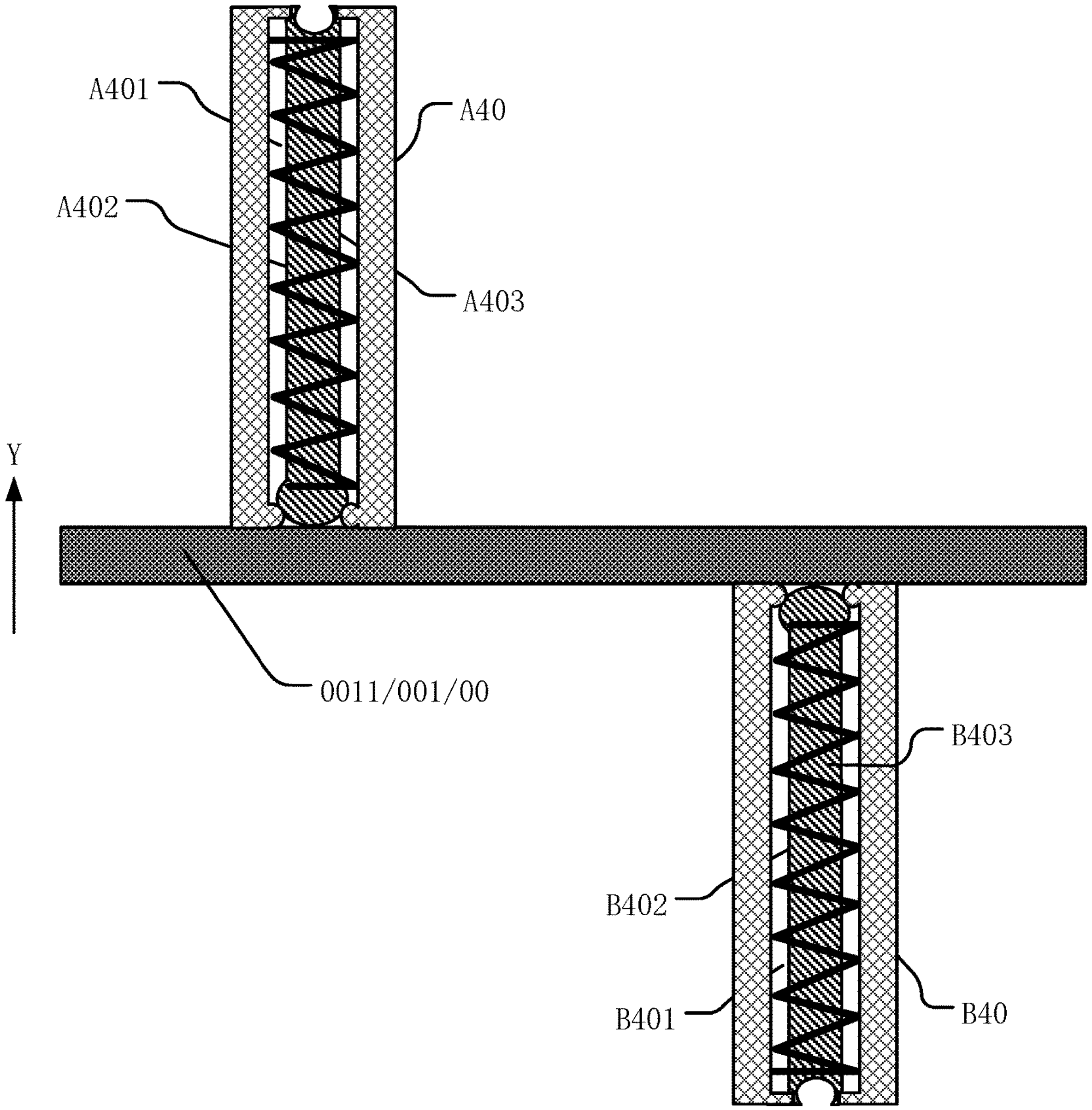
FIG. 25 illustrates a locally enlarged view of a first fixture and a second fixture in FIG. 24, consistent with various disclosed embodiments of the present disclosure.

In one embodiment, in the display device 000, the first display module 10 may include the first chute A201 and the second chute A101, and the second display module 20 may include the first chute B201 and the second chute B101. The first chute A201 of the first display module 10 and the first chute B201 of the second display module 20 may have the same structures, and the second chute A101 of the first display module 10 may have the same structure as the second chute B101 of the second display module 20. The structures of the first fixture A40 and the second fixture B40 may be the same. Further, the splicing structure in the display device 000 may include the interference fit shown in FIG. 8 to FIG. 17 in the previous embodiments. For details, please refer to FIG. 23 to FIG. 25. FIG. 23 is another schematic structural view of the display device provided by the embodiment of the present invention, FIG. 24 is a disassembled structural schematic view of the display device in FIG. 23, and FIG. 25 is a schematic diagram of a partially enlarged structure of the first fixture and the second fixture in FIG. 24. The arrows M1 and M2 in FIG. 24 indicate the direction of disassembly. The above structures including the first spherical plug, the second spherical plug, the first spherical groove, the second spherical chamber, the protrusion, the blocker, and so on, may further ensure the stability of the splicing structure, and will not be described here in this embodiment.

Figure 26:
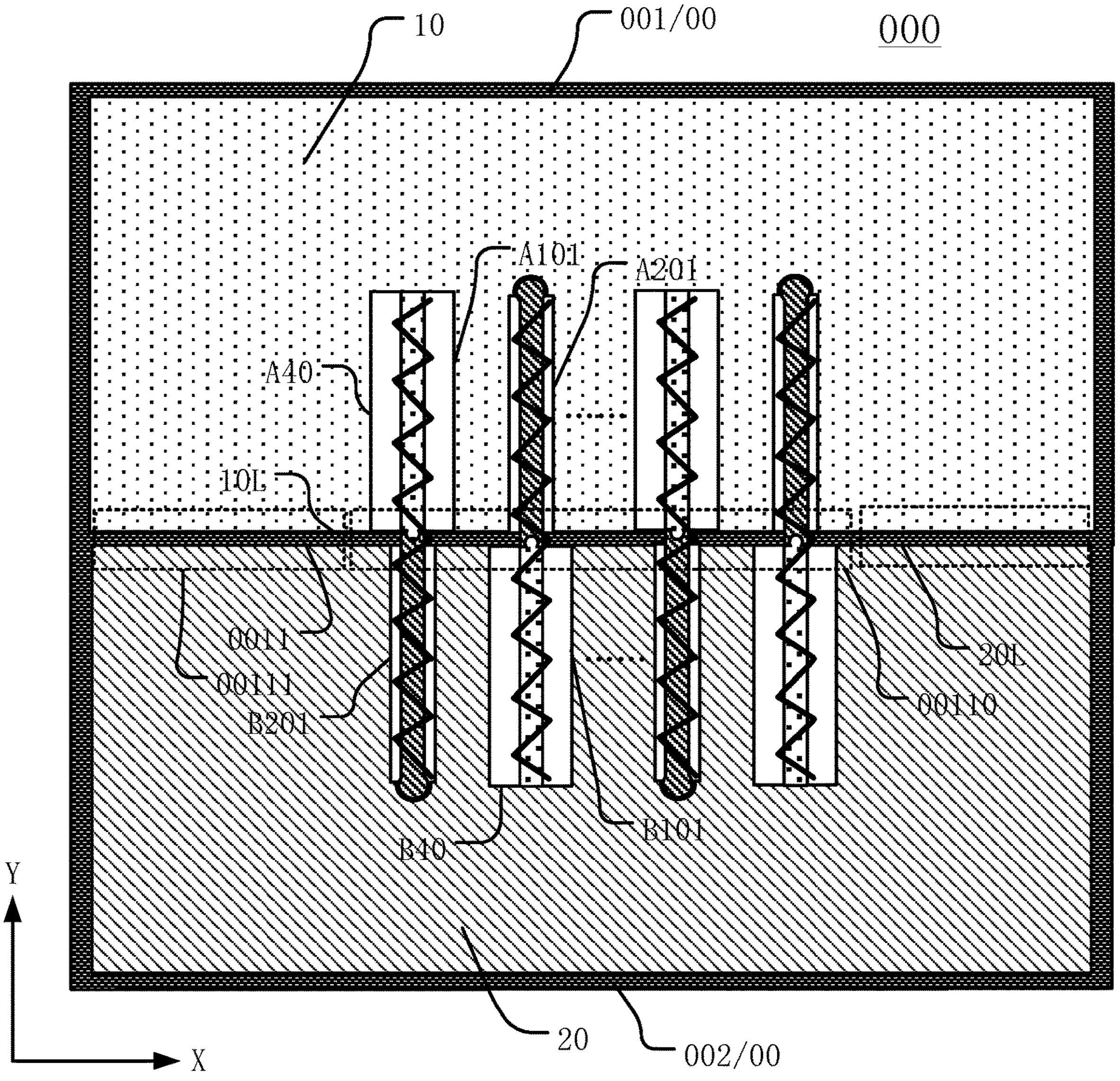
FIG. 26 illustrates another exemplary display device consistent with various disclosed embodiments of the present disclosure.
Figure 27:
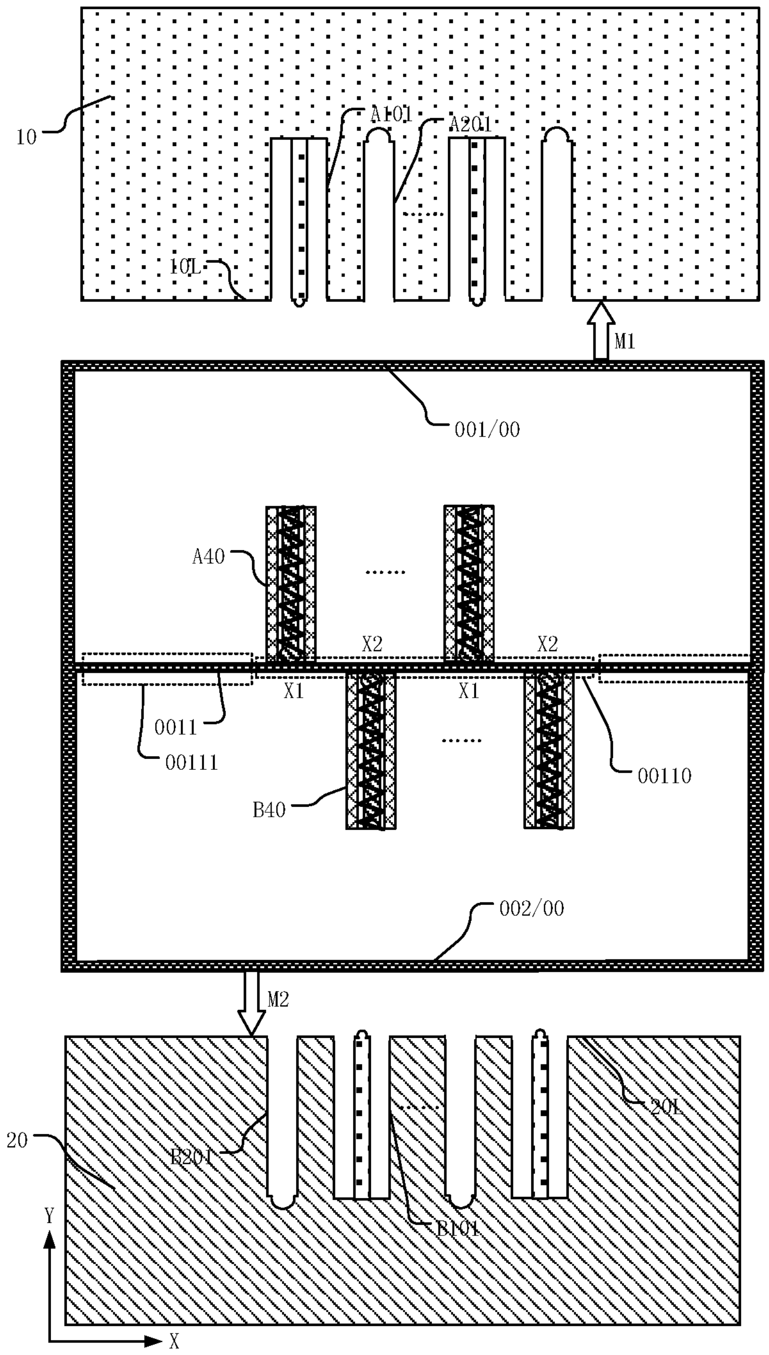
FIG. 27 illustrates another structure of a display device after disassembly in FIG. 26, consistent with various disclosed embodiments of the present disclosure.
Figure 28:
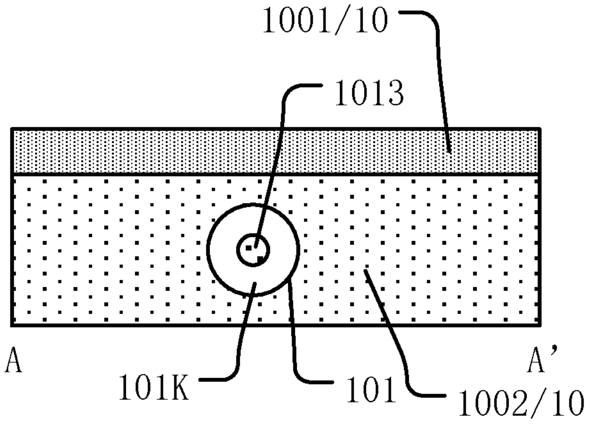
FIG. 28 illustrates a cross-sectional view of a first display module along an A-A' direction in FIG. 2, consistent with various disclosed embodiments of the present disclosure.

In some other embodiments shown in FIG. 26 illustrating another display device and FIG. 27 illustrating a disassembled structural schematic view of the display device in FIG. 26 (The arrows M1 and M2 in FIG. 27 indicate the direction of disassembly), the first display module 10 may include a plurality of first chutes A201 and a plurality of second chutes A101. The plurality of second chutes A101 and the plurality of first chutes A201 of the first display module 10 may be arranged alternately in the length extending direction X of the crossbar 0011. Optionally, the second display module 20 may include a plurality of first chutes B201 and a plurality of second chutes B101. The plurality of first chutes B201 and the plurality of second chutes B101 of the second display module 10 may be arranged alternately in the length extending direction X of the crossbar 0011. The length extension direction X of the crossbar 0011 may be perpendicular to the first direction Y.

In the present embodiments, the plurality of second chutes A101 and the plurality of first chutes A201 may be provided at the end 10L of the first display module 10. The plurality of second chutes A101 and the plurality of first chutes A201 of the first display module 10 may be arranged alternately in the length extending direction X of the crossbar 0011. Further, when the plurality of second chutes A101 and the plurality of first chutes A201 are provided at the end 10L of the first display module 10, the crossbar 0011 of the frame 00 may be provided with a plurality of first fixtures A40 and a plurality of second fixtures B40. The plurality of first fixtures A40 and the plurality of second fixtures B40 may be alternately arranged along the length extension direction X of the crossbar 0011, to improve the splicing accuracy of the first display module 10 and the second display module 20 in the first state after splicing and further improve the flatness of the display device 000.

Optionally, as shown in FIG. 26 and FIG. 27, a connection position of one of the plurality of first fixtures A40 and the crossbar 0011 may be a first position X1, a connection position of one of the plurality of second fixtures B40 and the crossbar 0011 may be a second position X2, and the first position X1 and the second position X2 may be not at the same position. When the display device 000 includes the plurality of first fixtures A40 and the plurality of second fixtures B40, first positions X1 and second positions X2 may be alternately arranged along the length extension direction X of the crossbar 0011. The plurality of second chutes A101 and the plurality of first chutes A201 of the first display module 10 may be arranged alternately in the length extending direction X of the crossbar 0011. The plurality of first fixtures A40 corresponding to the plurality of second chutes A101 and the plurality of second fixtures B40 corresponding to the plurality of first chutes A201 of the first display module 10 may also be alternately arranged along the length extension direction X of the crossbar 0011. Therefore, one first position X1 where one of the plurality of first fixtures A40 and the crossbar 0011 are connected and one corresponding second position X2 where a corresponding one of the plurality of second fixtures B40 and the crossbar 0011 are connected may be not at the same position.

When the display device 000 includes the plurality of first fixtures A40 and the plurality of second fixtures B40, the first display module 10 may include the plurality of second chutes A101 corresponding to the plurality of first fixtures A40 and the plurality of first chutes A201 corresponding to the plurality of second fixtures B40, and the second display module 20 may include the plurality of first chutes B201 corresponding to the plurality of first fixtures A40 and the plurality of second chutes B101 corresponding to the plurality of second fixtures B40. The structures of the plurality of first fixtures A40 and the plurality of second fixtures B40 are not specifically limited in the present disclosure, as long as the structures of the frame 00, the first display module 10, and the second display module 20 are able to cooperate to achieve assembly and disassembly.

In one embodiment, as shown in FIG. 26 and FIG. 27, along the length extension direction X of the crossbar 0011, the first positions X1 and the second positions X2 may be located in the middle area 00110 of the crossbar 0011.

In the present embodiment, when the plurality of first fixtures A40 and the plurality of second fixtures B40 for splicing the first display module 10 and the second display module 20 are arranged on the crossbar 0011 of the frame 00, along the length extension direction X of the crossbar 0011, one first position X1 where one of the plurality of first fixtures A40 and the crossbar 0011 are connected and one corresponding second position X2 where a corresponding one of the plurality of second fixtures B40 and the crossbar 0011 are connected may be located in the middle area 00110 of the crossbar 0011. The crossbar 0011 may include the middle area 00110 and the edge areas 00111 located on both sides of the middle area 00110 along the length extension direction X of the crossbar 0011. The first positions X1 and the second positions X2 may be set in the middle area 00110 of the crossbar 0011, to ensure the uniformity of the plugging force between the structures of the whole frame 00 with the first display module 10 and the second display module 20 after the first display module 10 is fixed with the crossbar 0011 by the plurality of first fixtures A40 and the second display module 20 is fixed with the crossbar 0011 by the plurality of second fixture sB40.

Figure 29:
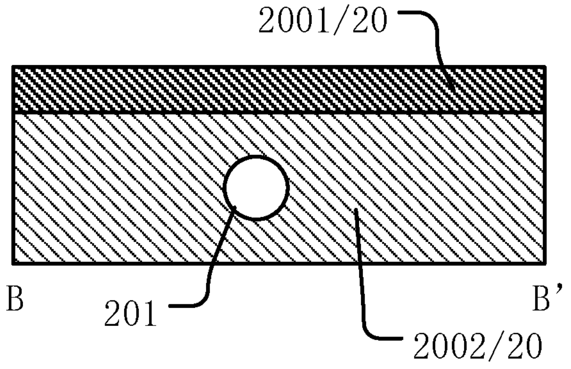
FIG. 29 illustrates a cross-sectional view of a second display module along a B-B' direction in FIG. 2, consistent with various disclosed embodiments of the present disclosure

In some other embodiments, as shown in FIG. 1 to FIG. 7, FIG. 28 illustrating a cross-sectional view of a first display module along an A-A' direction in FIG. 2 and FIG. 29 illustrating a cross-sectional view of a second display module along a B-B' direction in FIG. 2, the first display module 10 may include a first display panel 1001 and a first support component 1002. The first support component 1002 may be disposed on the backlight side of the first display panel 1001, and the second chute 101 may be opened on the first support component 1002.

The second display module 20 may include a second display panel 2001 and a second support component 2001. The second support component 2002 may be disposed on the backlight side of the second display panel 2001, and the first chute 201 may be opened on the second support component 2002.

In the present embodiment, the structure of the first display module 10 may at least include the first display panel 1001 and the first support component 1002. In this embodiment, the type of the first display panel 1001 is not limited. During specific implementation, the type and structure of the first display panel 1001 may be set according to actual needs, as long as the display function is achieved. The first supporting component 1002 may be located on the backlight side of the first display panel 1001, and the backlight side of the first display panel 1001 may be understood as a side facing away from the light-emitting surface of the first display panel 1001. The light-emitting surface of the first display panel 1001 may be the light-emitting surface of the display device 000, which is used to display pictures. The first supporting component 1002 may be used to support the first display panel 1001. Further, the chute structures such as the second chute 101 in the module structure may be set on the first supporting component 1002 to avoid affecting the display effect of the first display panel 1001. Similarly, the structure of the second display module 20 may include at least the second display panel 2001 and the second support component 2002. This embodiment does not limit the type of the second display panel 2001. During specific implementation, the type and structure of the second display panel 2001 may be set according to actual needs, as long as it is able to realize the display function. The second supporting component 2002 may be located on the backlight side of the second display panel 2001, and the backlight side of the second display panel 2001 may be understood as a side facing away from the light-emitting surface of the second display panel 2001. The light-emitting surface of the second display panel 2001 may be the light-emitting surface of the display device 000, which is used to display the pictures. When the spliced display device 000 is used, the light-emitting surface of the first display panel 1001 and the light-emitting surface of the second display panel 2001 may display images together to achieve a large-size display effect. The second support component 2002 may be used to support the second display panel 2001. And at the same time, the chute structures such as the first chute 201 may be set on the second supporting component 2002 to avoid affecting the display effect of the second display panel 2001.

When the second chute 101 is opened on the first support component 1002, the second chute 101 may be understood as a chamber opened on a side of the first support component 1002, and the opening of the second chute 101 with the cavity structure may be located at the side surface of the first support component 1002. The second chute 101 may extend along the first direction Y, and the first end 1011 of the second chute 101 may pass through the side of the first supporting component 1002. When the first chute 201 is opened on the second support component 2002, the first chute 201 may be understood as a chamber opened on the side of the second support component 2002, and the opening of the first chute 201 with the cavity structure may be located on the side surface of the second support component 2002. The first chute 201 may extend along the first direction Y, and one end of the first chute 201 may pass through the side of the second support component 2002.

The present embodiment where the first display module 10 includes the second chute but no first chute and the second display module includes the first chute but no second chute is used as an example to illustrate the present disclosure. In some other embodiments shown in FIG. 18 to FIG. 22, the first display module 10 may include the second chute and the first chute, and the second display module may include the first chute and the second chute. Therefore, the first chute of the first display module 10 may be also opened on the first support component 1002, and the second chute of the second display module 20 may be also opened on the second support component 2002. The second chute and the first chute included in the first display module 10 may be both arranged on the same side of the first support component 1002, and the first chute and the second chute of the second display module 20 may be both arranged on the same side of the second support component 2002.

Figure 30:
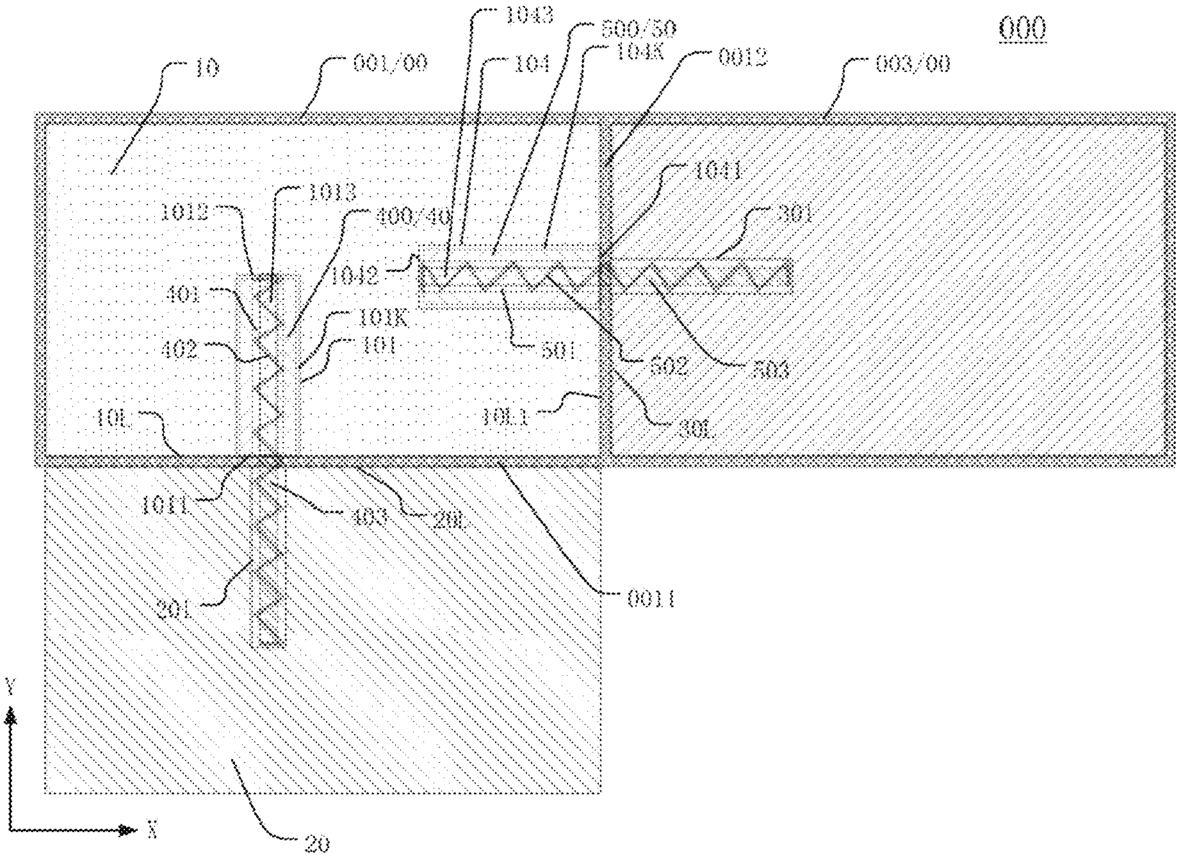
FIG. 30 illustrates another exemplary display device consistent with various disclosed embodiments of the present disclosure.
Figure 31:
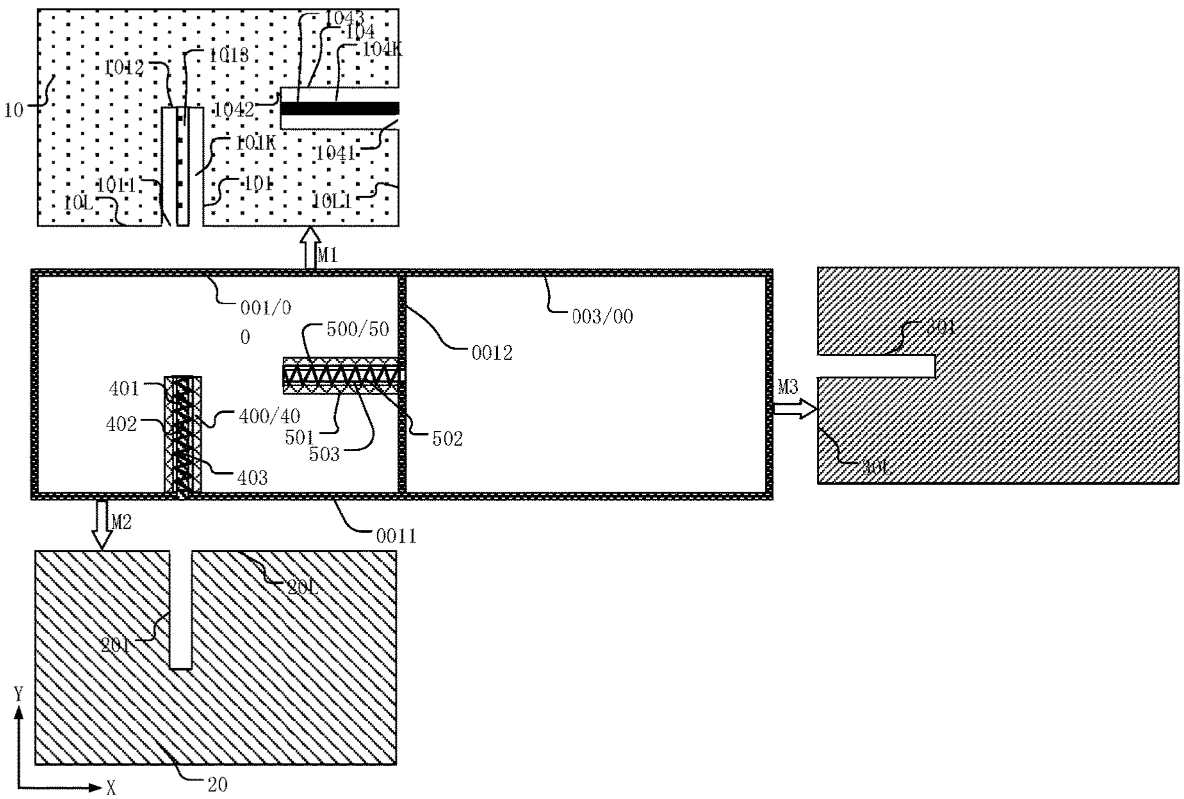
FIG. 31 illustrates another structure of a display device after disassembly in FIG. 30, consistent with various disclosed embodiments of the present disclosure.

In some embodiments shown in FIG. 30 which illustrates another display device and FIG. 31 illustrating a schematic structure of the display device after disassembly in FIG. 30 (the arrows M1, M2, and M3 in FIG. 31 indicate the disassembling direction), the frame 00 may further include a third frame unit 003. The third frame unit 003 and the first frame unit 001 may share a longitudinal rod 0012. The extension direction of the longitudinal rod 0012 may intersect the extension direction of the crossbar 0011, and the longitudinal rod 0012 and the crossbar 0011 may be connected. The extension direction of the longitudinal rod 0012 may be the first direction Y in the figure, and the extension direction of the crossbar 0011 may be the length extension direction X of the crossbar 0011 in the figure. The first direction Y and the length extending direction X of the crossbar 0011 may intersect. The present embodiment where the first direction Y and the length extending direction X of the crossbar 0011 are perpendicular to each other is used as an example to illustrate the present disclosure.

The first frame unit 001 on one side of the longitudinal rod 0012 may further include a third fixture 50. The third fixture may have the same structure as the first fixture 40. As shown in FIG. 30 and FIG. 31, the third fixture 50 may include a third body column 500 and a third chamber 501. The third chamber 501 may be disposed in the third body column 500. The third fixture 50 may be fixed with the longitudinal rod 0012 through the third body column 500, and a third sliding rod 503 may be movably connected in the third chamber 501 through a third elastic component 502. The specific structure and specific connection relationship of the third chamber 501, the third elastic component 502, and the third sliding rod 503 may be made reference to the structure of the first fixture 40 in the above-mentioned embodiment, and will not be described in detail here.

The display device 000 may further include a third display module 30. The side of the first display module 10 facing the longitudinal rod 0012 may include a fourth chute 104, and the fourth chute 104 may have the same structure as the second chute 101. As shown in FIG. 30 and FIG. 31, the fourth chute 104 may extend along the length extension direction X of the crossbar 0011, and the fourth chute 104 may include a fifth end 1041 and a sixth end 1042 opposite to each other in the length extension direction X of the crossbar 0011. The fifth end 1041 may pass through the other end 10L1 of the first display module 10. The fourth chute 104 may include a fourth pole 1043. One end of the fourth pole 1043 may be fixed to the sixth end 1042, and the fourth pole 1043 may extend along the length extension direction X of the crossbar 0011. The specific structure and specific connection relationship of the fourth pole 1043 may be made reference to the structure of the pole 1013 of the second chute 101 above-mentioned embodiments, and will not be repeated here.

The third display module 30 may include a fifth chute 301 on the side facing the longitudinal rod 0012. The fifth chute 301 may have the same structure as the first chute 201. As shown in FIG. 30 and FIG. 31, the fifth chute 301 may have an empty cavity structure, and at least one end of the fifth chute 301 may pass through the end 30L of the third display module 30.

In the first state, the third fixture 50 may be nested in the fourth chute 104 of the first display module 10, and the fourth pole 1043 in the fourth chute 104 may be inserted into the third chamber 501 of the third fixture 50. The fourth pole 1043 in the fourth chute 104 may push out of the third sliding rod 503 of the third fixture 50, such that the third sliding rod 503 of the third fixture 50 may be inserted into the fifth chute 301 of the third display module 50.

In the second state, the fourth pole 1043 of the fourth chute 104 in the first display module 10 may be pulled out from the third chamber 501 of the third fixture 50, and the first display module 10 may be separated from the third fixture 50. The third sliding rod 503 of the third fixture 50 may be retracted from the fifth chute 301 of the third display module 30 into the third chamber 501 of the third fixture 50, and the third display module 30 may be separated from the third fixture 50.

In the present embodiment, the frame 00 may further include the third frame unit 003 and the third display module 30. The third display module 30 may be further spliced with the first display module 10 and the second display module 20 through the structure of the third frame unit 003, to further expand the display area of the display device 000. Specifically, the display device 000 may have a first state, and the first state may be understood as the spliced state of the first display module 10, the second display module 20, and the third display module 30 of the display device 000 (as shown in FIG. 30). When the display device 000 is spliced from the disassembled state shown in FIG. 31 to the first state shown in FIG. 30, the first display module 10 may be fixed on the first frame unit 001 of the frame 00 through the first fixture 40. Since there is a first space 101K between the pole 1013 in the second chute 101 and the side wall of the second chute 101, the first fixture 40 may be inserted into the first space 101K. The pole 1013 in the second chute 101 of the first display module 10 may be inserted into the chamber 401 of the first fixture 40. Therefore, the pole 1013 may push out the sliding rod 403 of the first fixture 40. Although the sliding rod 403 is pushed out from the chamber 401 of the first fixture 40, it may be still in a state of movably connected with the elastic component 402 because of the stretching function of the elastic component 402. After the sliding rod 403 is pushed out from the chamber 401 of the first fixture 40, the sliding rod 403 may continue to be inserted into the first chute 201 of the second display module 20 along the first direction Y, such that the second display module 20 is spliced and fixed with the first display module 10 through the insertion and connection of the sliding rod 403 pushed out from the chamber 401 of the first fixture 40 and the first chute 201. Also, the third fixture 50 may be nested in the fourth chute 104 of the first display module 10, such that the first display module 10 is further stably fixed on the first frame unit 001 of the frame 00 through the third fixture 50. Since there is a fourth space 104K between the fourth pole 1043 in the fourth chute 104 and the side wall of the fourth chute 104, the third fixture 50 may be inserted into the fourth space 104K, and the fourth pole 1043 in the fourth chute 104 of the first display module 10 may be inserted into the third chamber 501 of the third fixture 50. Therefore, the fourth pole 1043 may push out the third sliding rod 503 of the third fixture 50. Because of the stretching effect of the third elastic component 502, although the third sliding rod 503 is pushed out from the third chamber 501 of the third fixture 50, it may be still in a state of being movably connected with the third elastic component 502. After the third sliding rod 503 is pushed out to the outside of the third chamber 501 of the third fixture 50, the third sliding rod 503 may continue to be inserted into the fifth chute 301 of the third display module 30 along the length extension direction X of the crossbar 0011, such that the third display module 30 is spliced and fixed with the first display module 10 to form a splicing module structure as shown in FIG. 30.

When the display device 000 is in the second state, that is, in the disassembled state, as shown in FIG. 31, when the display device 000 is disassembled from the first state shown in FIG. 30 to the second state shown in FIG. 31, the second display module 20 may be pulled out from the outside of the sliding rod 403, and the third display module 30 may be pulled out from the outside of the third sliding rod 503. The first chute 201 of the second display module 20 may be separated from the sliding rod 403 of the first fixture 40, and the fifth chute 301 of the third display module 30 may be separated from the third sliding rod 503 of the third fixture 50. The sliding rod 403 of the first fixture 40 may retract into the chamber 401 of the first fixture 40, and push out the pole 1013 of the first display module 10. The third sliding rod 503 of the third fixture 50 may retract into the third chamber 501 of the third fixture 50, and may push out the fourth pole 1043 in the fourth chute 104, such that the first display module 10 is separated from the first fixture 40 and the first display module 10 is separated from the third fixture 50. Therefore, the process of disassembling and separating the first display module 10, the second display module 20, and the third display module 30 may be completed.

Adopting the disassembly structure that is able to be assembled and disassembled in the present embodiment may be able to form an interlock structure between the first display module 10, the second display module 20, and the third display module 30 after splicing, and also minimize the gap between them, to improve the stability of modules after splicing, the overall flatness and the user's viewing effect. Further, the disassembly process may be simple and time-consuming may be small, therefore reducing the corresponding adjustment time between the display modules. The disassembly process may be greatly simplified. In the process of assembly and disassembly, the cooperation between the various mechanism parts may be smooth, and the difficulty of splicing and disassembly may be reduced, to ensure the splicing effect and improve the disassembly efficiency at the same time.

Figure 32:
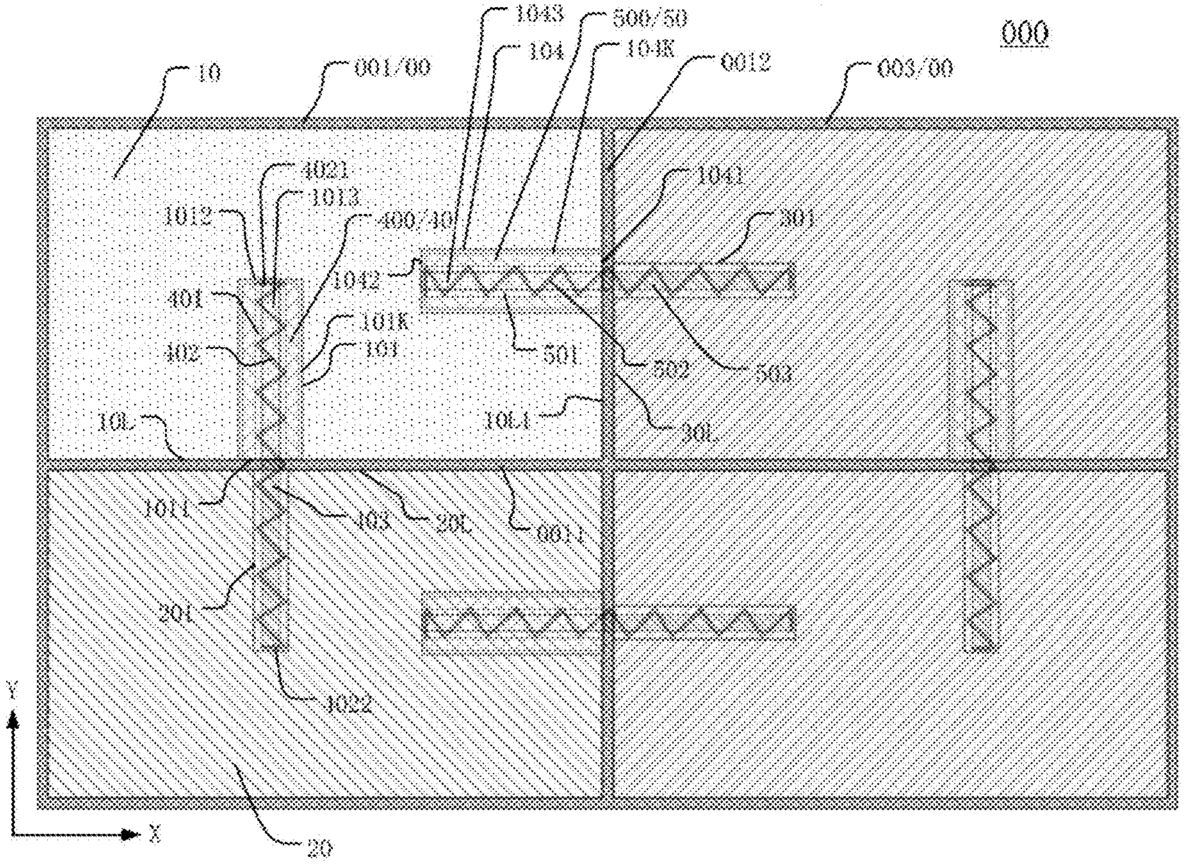
FIG. 32 illustrates another exemplary display device consistent with various disclosed embodiments of the present disclosure.

In some other embodiments, the display device 000 may include four or more display modules. As shown in FIG. 32, in one embodiment, a fourth display module may be further provided at a right side of the second frame unit 002. A structure same as the first fixture and the third fixture may be used to realize splicing between the fourth display module and the third display module, and between the fourth display module and the second display module, to further increase the display area. The structure may be made reference to the previous embodiments, and will not be repeated here.

Figure 33:
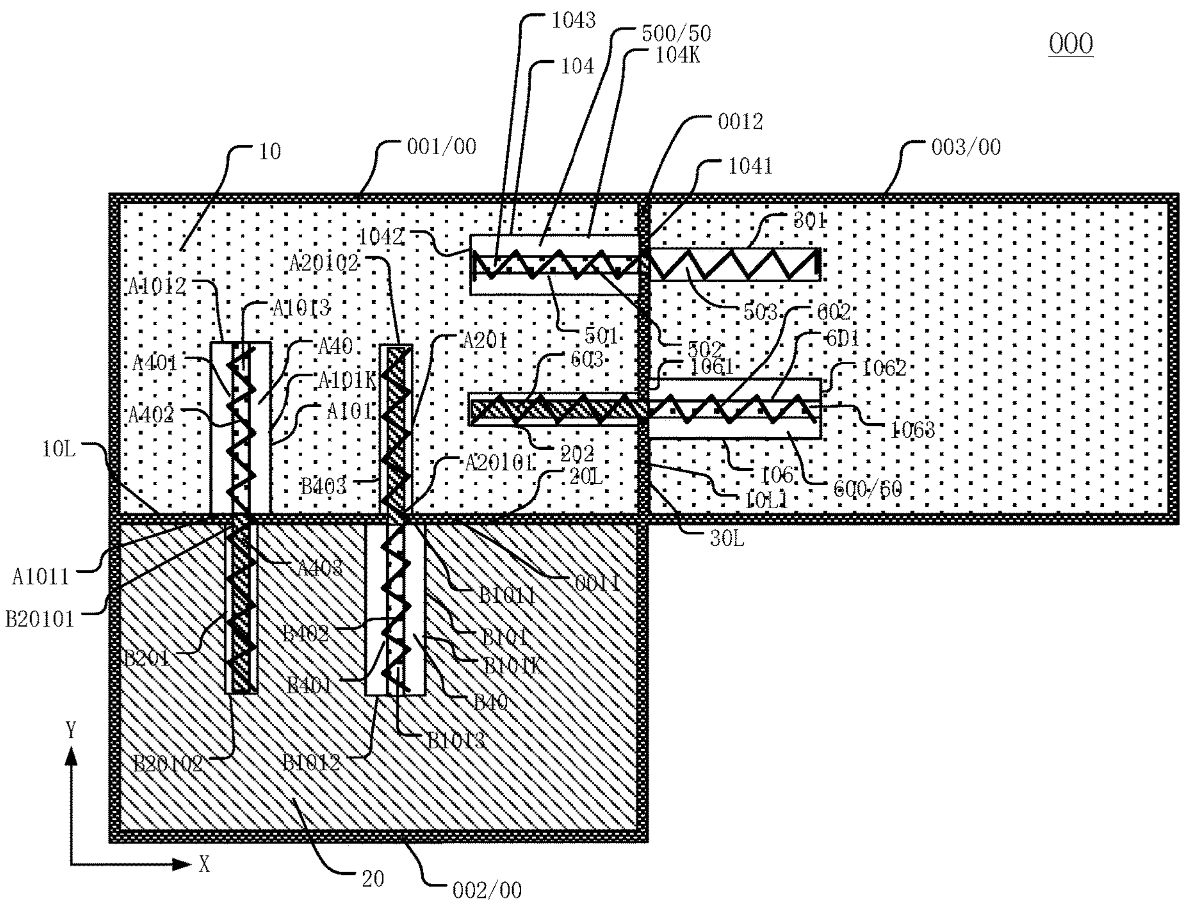
FIG. 33 illustrates another exemplary display device consistent with various disclosed embodiments of the present disclosure.
Figure 34:
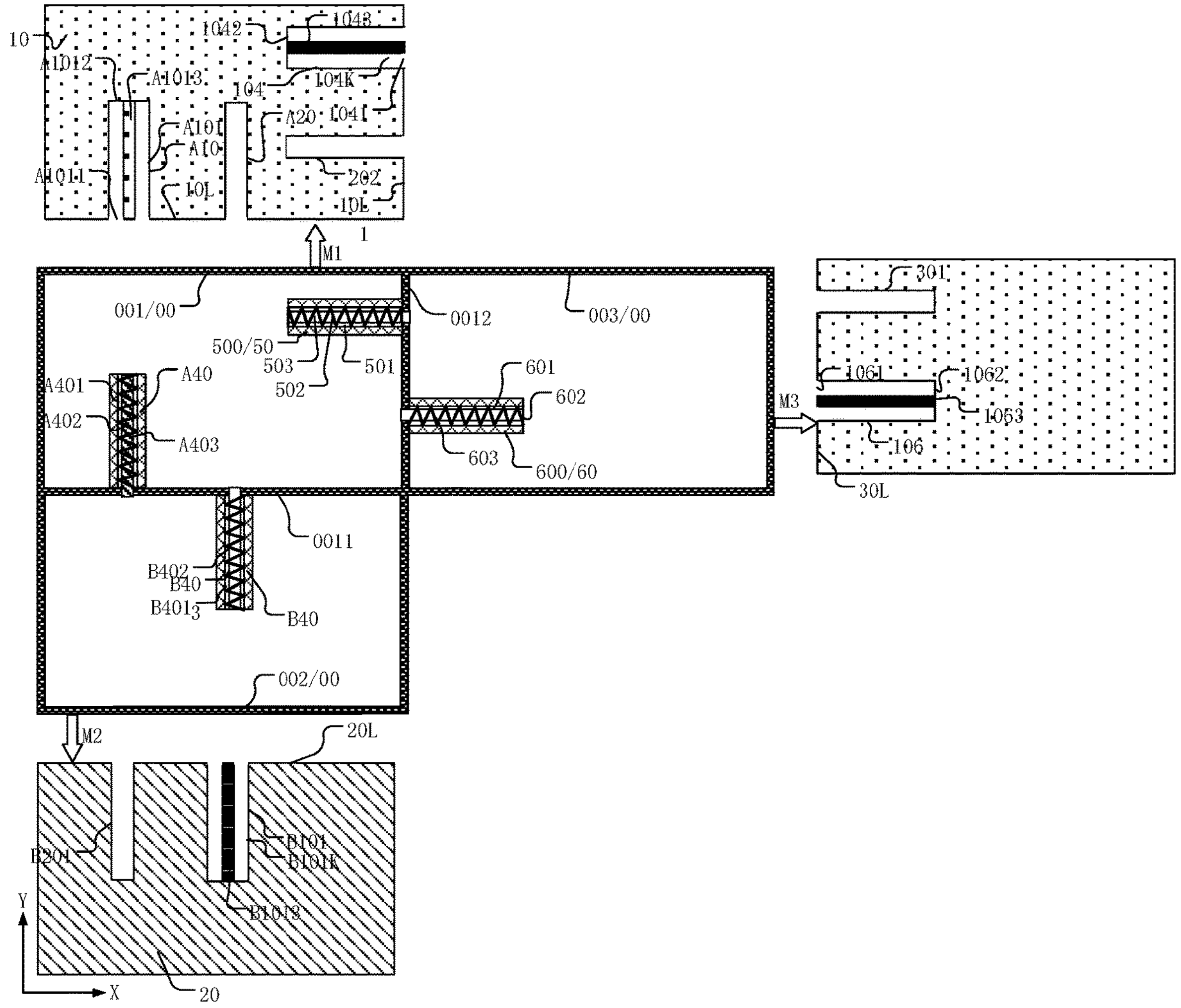
FIG. 34 illustrates another structure of a display device after disassembly in FIG. 33, consistent with various disclosed embodiments of the present disclosure.

In some embodiments shown in FIG. 33 which illustrates another display device and FIG. 34 illustrating a schematic structure of the display device after disassembly in FIG. 33 (arrows M1, M2, and M3 in FIG. 34 indicate the disassembling direction), along the length extension direction X of the crossbar 0011, the third frame unit 003 may include a fourth fixture 60 on the other side of the longitudinal rod 0012. The fourth fixture 60 may have the same structure as the first fixture 40. As shown in FIG. 33 and FIG. 34, the fourth fixture 60 may include a fourth body column 600 and a fourth chamber 601. The fourth chamber 601 may be opened in the fourth body column 600. The fourth fixture 60 may be fixed with the longitudinal rod 0012 through the fourth body column 600. A fourth sliding rod 603 may be movably connected in the fourth chamber 601 through a fourth elastic component 602. The specific structure and specific connection relationship of the fourth chamber 601, the fourth elastic component 602, and the fourth sliding rod 603 may be made reference to the above-mentioned implementation.

The first display module 10 may further include a third chute 202 on the side facing the longitudinal rod 0012, and the third chute 202 may have the same structure as the first chute 201. Although the third chute 202 in this embodiment may have the same structure as that of the first chute 201, to distinguish the third chute 202 and the first chute 201 on different sides of the first display module 10, the structures of the third chute 202 in this embodiment are separately labeled. As shown in FIG. 33 and FIG. 34, the third chute 202 may have a cavity structure, and at least one end of the third chute 202 may pass through the other end 10L1 of the first display module 10.

The third display module 30 may further include a sixth chute 106 on the side facing the longitudinal rod 0012. The sixth chute 106 may have the same structure as the second chute 101. It can be understood that although the sixth chute 106 in this embodiment may have the same structure as the second chute 101, to distinguish the second chute 101 provided on the first display module 10 from the sixth chute 106 provided on the third display module 30, the structure of the sixth chute 106 in this embodiment is named separately. As shown in FIG. 33 and FIG. 34, the sixth chute 106 may extend along the length extension direction X of the crossbar 0011. In the length extension direction X of the crossbar 0011, the sixth chute 106 may include a seventh end 1061 and an eighth end 1062 opposite to each other. The seventh end 1061 may pass through the end 30L of the third display module 30, and the sixth chute 106 may further include a sixth pole 1063. One end of the sixth pole 1063 may be fixed at the eighth end 1062. The sixth pole 1063 may extend along the length extension direction X of the crossbar 0011. The specific structure and specific connection relationship of the sixth pole 1063 may be made reference to the pole 1013 of the second chute 101 in the above-mentioned embodiments, and this embodiment will not be described in detail here.

In the first state, the third fixture 50 may be nested in the fourth chute 104 of the first display module 10, and the fourth pole 1043 in the fourth chute 104 may be inserted into the third chamber 501 of the third fixture 50. Therefore, the fourth pole 1043 in the fourth chute 104 may push out the third sliding rod 503 of the third fixture 50, and the third sliding rod 503 of the third fixture 50 may be inserted into the fifth chute 301 of the third display module 50. The fourth fixture 60 may be nested in the sixth chute 106 of the third display module 30, and the sixth pole 1063 in the sixth chute 106 may be inserted into the fourth chamber 601 of the fourth fixture 60. Therefore, the sixth pole 1063 in the sixth chute 106 may push out the fourth sliding rod 603 of the fourth fixture 60, and the fourth sliding rod 603 of the fourth fixture 60 may be inserted into the third chute 202 of the first display module 10. The splicing effect of the first display module 10 and the third display module 30 may be jointly realized.

In the second state, the fourth pole 1043 in the fourth chute 104 of the first display module 10 may be pulled out from the third chamber 501 of the third fixture 50, and the first display module 10 and the third fixture 50 may be separated. The third sliding rod 503 of the third fixture 50 may retract from the fifth chute 301 of the third display module 30 into the third chamber 501 of the third fixture 50, and the third display module 30 and the third fixtures 50 may be separated. The sixth pole 1063 in the sixth chute 106 of the third display module 30 may be pulled out from the fourth chamber 601 of the fourth fixture 60, and the third display module 30 and the fourth fixture 60 may be separated. The fourth sliding rod 603 of the fourth fixture 60 may retract from the third chute 202 of the first display module 10 into the fourth chamber 601 of the fourth fixture 60, and the first display module 10 and the fourth fixture 60 may be separated.

Adopting the disassembly structure that is able to be assembled and disassembled in the present embodiment may be able to minimize the gap between the first display module 10, the second display module 20, and the third display module 30 after splicing, to improve the stability of modules after splicing, the overall flatness and the user's viewing effect. Further, the disassembly process may be simple and time-consuming may be small, therefore reducing the corresponding adjustment time between the display modules. The disassembly process may be greatly simplified. In the process of assembly and disassembly, the cooperation between the various mechanism parts may be smooth, and the difficulty of splicing and disassembly may be reduced, to ensure the splicing effect and improve the disassembly efficiency at the same time. The third fixture 50 and the fourth fixture 60 may make the first display module 10 and the third display module 30 after splicing stabler and more reliable, to further improve the stability and the overall flatness of the modules after splicing.

Figure 35:
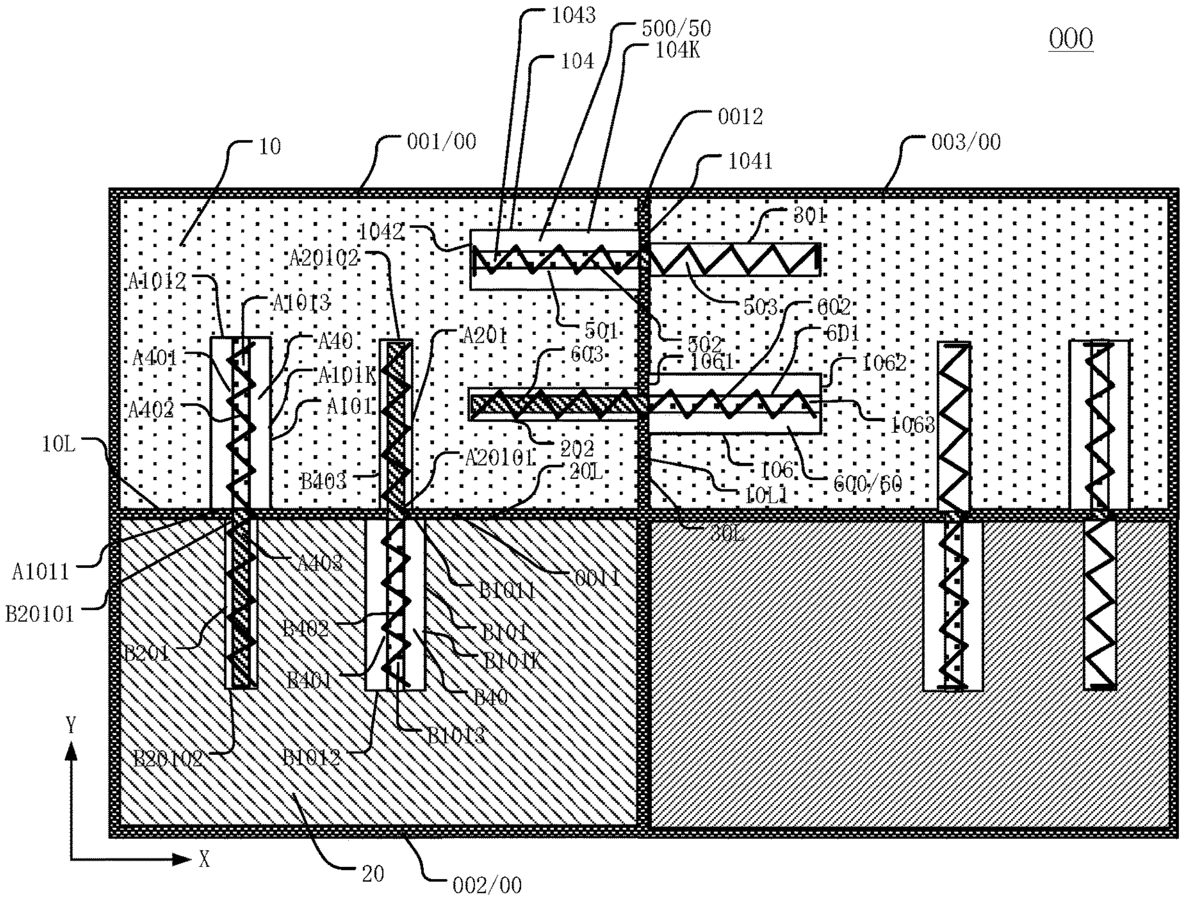
FIG. 35 illustrates another exemplary display device consistent with various disclosed embodiments of the present disclosure.

In some other embodiments, the display device 000 may include four or more display modules. As shown in FIG. 35, in one embodiment, a fourth display module may be further provided at a right side of the second frame unit 002. A structure same as the first fixture, the second fixture, the third fixture and the fourth fixture may be used to realize splicing between the fourth display module and the third display module, and between the fourth display module and the second display module, to further increase the display area. The structure may be made reference to the previous embodiments, and will not be repeated here.

In the display device provided by various embodiments of the present disclosure, the display device may be a spliced display device. The display device may include a frame, a first display module and a second display module. The first display module and the second display module may be spliced through the frame to form a large-sized display device. The display device may have a first state, and the first state may be understood as a state after splicing the first display module and the second display module. When the display device is spliced from the disassembled state to the first state, the first fixture may be nested in the second chute of the first display module, such that the first display module is fixed on the first frame unit through the first fixture. The pole in the second chute included in the first display module may be inserted into the chamber of the first fixture. The pole may push out the sliding rod of the first fixture. Although the sliding rod is pushed out from the chamber of the first fixture, it may be still in a state of movably connected with the elastic component because of the stretching effect of the elastic component. After the sliding rod is pushed out to the outside of the chamber of the first fixture, the sliding rod may continue to be inserted into the first chute of the second display module along the first direction, such that the second display module may be spliced and fixed with the first display module through the plug and connection between the sliding rod pushed out to the outside of the chamber of the first fixture and the first chute. The present disclosure adopts the above-mentioned splicing assembly structure to form an interlocking structure. Therefore, the gap between the spliced first display module and the second display module may be minimized, and the stability of the spliced first display module and second display module may be improved, to improve the overall flatness and the user's viewing effect. Further, the disassembly between the modules of the display device may be completed with the help of the resilience of the elastic component. When the elastic component is reset and retracted, the sliding rod may be retracted into the chamber to realize the disassembly of the modules of the display device, to save time and energy. In the present disclosure, splicing effect may be achieved through simple structures, simple operations, and short time consumption. The corresponding adjustment time between each display module may be reduced, and the cooperation between mechanism parts may be smooth, effectively reducing splicing difficulty and ensuring splicing effect. At the same time, the assembly efficiency may also be improved. Further, the display device may be able to realize the splicing of at least two display modules and the first frame unit at one time by using the structure of the frame. In comparison to the process where the frame unit is spliced with each single display module and then the at least two structures formed by the display modules and the frame unit are spliced again, the assembly steps may be reduced and the assembly efficiency may be improved.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display device, comprising a frame, a first display module, and a second display module, wherein:

the frame at least includes a first frame unit and the first frame unit includes a first fixture, wherein the first fixture includes a chamber and a sliding rod is movably connected in the chamber through an elastic component;

the first display module includes a first chute and a second chute, the second chute of the first display module extending along a first direction;

the second chute of the first display module includes a first end and a second end opposite to each other in the first direction;

the first end passes through an end of the first display module;

the second chute of the first display module includes a pole, wherein one end of the pole is fixed to the second end and the pole extends along the first direction;

the second display module includes a first chute, wherein the first chute of the second display module is a cavity structure and at least one end of the first chute of the second display module passes through an end of the second display module;

the display device has a first state; and in the first state, the first fixture is nested in the second chute of the first display module and the pole of the first display module is inserted into the chamber of the first fixture, such that the pole of the first display module pushes out the sliding rod of the first fixture and the sliding rod of the first fixture is inserted into the first chute of the second display module.

2. The display device according to claim 1, wherein:

the display device also has a second state; and in the second state, the pole of the first display module is pulled out from the chamber of the first fixture such that the first display module is separated from the first fixture, and the sliding rod of the first fixture retracts from the first chute of the second display module into the chamber of the first fixture such that the second display module is separated from the first fixture.

3. The display device according to claim 2, wherein:

the first frame unit includes a crossbar and the first fixture is fixed on the crossbar; and in the first state, the first display module is located at one side of the crossbar, and the second display module is located at another side of the crossbar.

4. The display device according to claim 3, wherein:

the frame further includes a second frame unit and the second frame unit includes a second fixture with a structure same as the structure of the first fixture;

the first frame unit and the second frame unit share the same crossbar;

the first fixture is fixed at a side of the crossbar facing the first frame unit and the second fixture is fixed on another side of the crossbar facing the second frame unit; and in the first state, the second display module is installed in the second frame unit through the second fixture.

5. The display device according to claim 4, wherein:

the second display module further includes a second chute;

in the first state, the second fixture is nested in the second chute of the second display module, and the pole of the second display module is inserted into the chamber of the second fixture to push out the sliding rod of the second fixture, such that the sliding rod of the second fixture is inserted into the first chute of the first display module; and in the second state, the pole of the second display module is pulled out from the chamber of the second fixture such that the second display module is separated from the second fixture, and the sliding rod of the second fixture retracts from the first chute of the first display module into the chamber of the second fixture such that the first display module is separated from the second fixture.

6. The display device according to claim 5, wherein:

the first display module includes a plurality of first chutes including the first chute of the first display module and a plurality of second chutes including the second chute of the first display module; and along a length extension direction of the crossbar, the plurality of first chutes and the plurality of second chutes of the first display module are disposed alternately.

7. The display device according to claim 4, wherein:

a connection position of the first fixture and the crossbar is a first position, and a connection position of the second fixture and the crossbar is a second position, wherein the first position and the second position are not at a same position.

8. The display device according to claim 7, wherein:

the display device includes a plurality of first fixtures and a plurality of second fixtures; and along a length extension direction of the crossbar, first positions and second positions are arranged alternately.

9. The display device according to claim 7, wherein:

along a length extension direction of the crossbar, both the first position and the second position are located in a middle area of the crossbar.

10. The display device according to claim 4, wherein:

the frame further includes a third frame unit;

the third frame unit shares a longitudinal rod with the first frame unit;

an extension direction of the longitudinal rod intersects an extension direction of the crossbar;

the longitudinal rod is connected with the crossbar;

the first frame unit on one side of longitudinal rod includes a third fixture, wherein the third fixture has a structure same as the first fixture;

the display device further includes a third display module;

the first display module further includes a third chute;

a side of the first display module facing the longitudinal rod includes a fourth chute, wherein the fourth chute has a structure same as the second chute of the first display module;

a side of the third display module facing the longitudinal rod includes a fifth chute, wherein the fifth chute has a structure same as the first chute of the second display module;

in the first state, the third fixture is nested in the fourth chute of the first display module, a pole in the fourth chute is inserted into the chamber of the third fixture, such that the pole in the fourth chute pushes out a sliding rod of the third fixture and the sliding rod of the third fixture is inserted into the fifth chute of the third display module; and in the second state, the pole in the fourth chute of the first display module is pulled out from the chamber of the third fixture such that the first display module is separated from the third fixture, and the sliding rod of the third fixture retracts from the fifth chute of the third display module into the chamber of the third fixture such that the third display module and the third fixture are separated.

11. The display device according to claim 10, wherein:

the third frame unit on the other side of the longitudinal rod includes a fourth fixture, wherein the fourth fixture has a structure same as the first fixture;

the third chute is disposed on the side of the first display module facing the longitudinal rod, wherein the third chute has a structure same as the second chute of the first display module;

the side of the third display module facing the longitudinal rod includes a sixth chute, wherein the sixth chute has a structure same as the second chute of the first display module;

in the first state, the fourth fixture is nested in the sixth chute of the third display module and a pole in the sixth chute is inserted into the chamber of the fourth fixture, such that the pole in the sixth chute pushes out a sliding rod of the fourth fixture and the sliding rod of the fourth fixture is inserted into the third chute of the first display module; and in the second state, the pole in the sixth chute of the third display module is pulled out from the chamber of the fourth fixture such that the third display module is separated from the fourth fixture, and the sliding rod of the fourth fixture retracts from the third chute of the first display module into the chamber of the fourth fixture such that the first display module and the fourth fixture are separated.

12. The display device according to claim 3, wherein:

the first fixture includes a main body column and the chamber is disposed in the main body column;

the first fixture is fixed to the crossbar through the main body column; and a shape of the main body column matches a shape of the second chute of the first display module.

13. The display device according to claim 3, wherein:

an end of the sliding rod in the first fixture facing the crossbar includes a first spherical plug and a bottom of the first chute of the second display module includes a first spherical groove; and in the first state, the first spherical groove of the second display module is engaged and matched with the first spherical plug of the first fixture.

14. The display device according to claim 13, wherein:

an outer diameter of the sliding rod is smaller than a maximum outer diameter of the first spherical plug, and a maximum outer diameter of the first spherical groove is equal to the maximum outer diameter of the first spherical plug.

15. The display device according to claim 13, wherein:

an inner diameter of the chamber is larger than or equal to a maximum outer diameter of the first spherical plug; and an inner diameter of the first chute of the second display module is larger than or equal to the maximum outer diameter of the first spherical plug.

16. The display device according to claim 3, wherein:

an end of the sliding rod in the first fixture away from the crossbar includes a first spherical chamber;

at the first end, an end of the pole in the second chute of the first display module includes a second spherical plug; and in the first state, the second spherical plug of the first display module is engaged and matched with the first spherical chamber of the first fixture.

17. The display device according to claim 16, wherein: a maximum outer diameter of the second spherical plug is L1, and an inner diameter of the first spherical chamber at the end of the first fixture is L2; wherein, L1>L2.

18. The display device according to claim 16, wherein: a protrusion is provided on an inner wall of an end of the chamber close to the crossbar, and a blocker is provided at another end of the chamber away from the crossbar.

19. The display device according to claim 18, wherein: a maximum outer diameter of the second spherical plug is smaller than an inner diameter of the chamber at the position of the blocker; and the inner diameter of the chamber at the position of the blocker is smaller than an outer diameter of the sliding rod.

20. The display device according to claim 18, wherein: the protrusion has a smooth surface.

21. The display device according to claim 3, wherein: the elastic component includes a spring;

one end of the spring is connected to an end of the chamber away from the crossbar, and another end of the spring is connected to an end of the sliding rod facing the crossbar.

22. The display device according to claim 1, wherein: the elastic component is wound around a periphery of the sliding rod.

23. The display device according to claim 1, wherein the elastic component is stretched in the first state.

24. The display device according to claim 1, wherein: the first chute of the second display module includes a third end and a fourth end opposite to each other in the first direction;

the third end passes through an end of the second display module; and in the first state, the first end of the second chute of the first display module is opposite to the third end of the first chute of the second display module, and the first end of the second chute of the first display module and the third end of the first chute of the second display module extend along a same straight line in the first direction.

25. The display device according to claim 1, wherein: a shape of the sliding rod matches a shape of the cavity structure of the first chute of the second display module, and a length of the sliding rod is equal to a depth of the first chute of the second display module; and a shape of the pole matches the shape of the chamber and a length of the strut is equal to a depth of the chamber.

26. The display device according to claim 1, wherein: along a length extension direction of the sliding rod, a length of the sliding rod is larger than ⅓ of a width of the first frame unit.

27. The display device according to claim 1, wherein: the first display module includes a first display panel and a first support component, wherein the first support component is located on a backlight side of the first display panel and the second chute of the first display module is opened on the first support component; and the second display module includes a second display panel and a second support component, wherein the second support component is located on a backlight side of the second display panel and the first chute of the second display module is opened on the second support component.

* * * * *